(12) United States Patent
Halasz et al.

(10) Patent No.: US 9,591,508 B2
(45) Date of Patent: Mar. 7, 2017

(54) METHODS AND APPARATUS FOR TRANSMITTING DATA BETWEEN DIFFERENT PEER-TO-PEER COMMUNICATION GROUPS

(71) Applicant: Google Technology Holdings LLC, Mountain View, CA (US)

(72) Inventors: David E. Halasz, Stow, OH (US); Apostolis K. Salkintzis, Athens (GR); Dwight R. Smith, Grapevine, TX (US)

(73) Assignee: Google Technology Holdings LLC, Mountain View, CA (US)

( * ) Notice: Subject to any disclaimer, the term of this patent is extended or adjusted under 35 U.S.C. 154(b) by 321 days.

(21) Appl. No.: 13/721,771

(22) Filed: Dec. 20, 2012

(65) Prior Publication Data

US 2014/0177472 A1    Jun. 26, 2014

(51) Int. Cl.
*H04L 12/28* (2006.01)
*H04W 28/02* (2009.01)
(Continued)

(52) U.S. Cl.
CPC ....... *H04W 28/021* (2013.01); *H04L 67/1091* (2013.01); *H04W 84/18* (2013.01)

(58) Field of Classification Search
CPC ......... H04L 29/08306; H04L 29/06326; G06F 2221/0788; G06F 2221/078
(Continued)

(56) References Cited

U.S. PATENT DOCUMENTS 4,612,669 A    9/1986  Nossen
4,631,543 A    12/1986 Brodeur
(Continued)

FOREIGN PATENT DOCUMENTS

CN    1762137    4/2006
CN    1859656    11/2006
(Continued)

OTHER PUBLICATIONS

WiFi Alliance Neighbor Awareness Networking Marketing Task Group, Market & Motivation (MRD Section3) for Interoperability Testing of Neighbor Awareness Networking, Version 0.14, 2011, all pages.
(Continued)

*Primary Examiner* — Shaq Taha
(74) *Attorney, Agent, or Firm* — Wolfe-SBMC

(57) ABSTRACT

Methods and apparatus for transmitting data between different peer-to-peer communication groups are disclosed. A wireless device determines if it is simultaneously connected to a plurality of peer-to-peer communication groups and instantiates a bridge interface at the wireless device (e.g., TRILL RBridge) for communications between each peer-to-peer communication group. The wireless device also determines if it is simultaneously connected to at least one peer-to-peer communication device and an access point. In such an instance, the wireless device determines if the access point also includes a bridge interface. If the access point does not include a bridge interface, the wireless device instantiates/runs the bridge interface at the wireless device for communications between the at least one peer-to-peer communication device and the access point. If the access point does include a bridge interface, the wireless device causes the bridge interface at the access point to be instantiated for communications between the at least one peer-to-peer communication device and the access point.

20 Claims, 10 Drawing Sheets

(51) Int. Cl.
*H04L 29/08* (2006.01)
*H04W 84/18* (2009.01)

(58) Field of Classification Search
USPC ........................................................ 370/401
See application file for complete search history.

(56) References Cited

U.S. PATENT DOCUMENTS

| | | | |
|---|---|---|---|
| 4,754,285 A | 6/1988 | Robitaille | |
| 4,881,123 A | 11/1989 | Chapple | |
| 4,884,252 A | 11/1989 | Teodoridis et al. | |
| 4,953,197 A | 8/1990 | Kaewell, Jr. et al. | |
| 5,267,234 A | 11/1993 | Harrison | |
| 5,459,440 A | 10/1995 | Claridge et al. | |
| 5,564,086 A | 10/1996 | Cygan et al. | |
| 5,634,200 A | 5/1997 | Kitakubo et al. | |
| 5,649,307 A | 7/1997 | Patino | |
| 5,699,319 A | 12/1997 | Skrivervik | |
| 5,757,326 A | 5/1998 | Koyama et al. | |
| 5,804,944 A | 9/1998 | Alberkrack et al. | |
| 5,862,458 A | 1/1999 | Ishii | |
| 6,144,186 A | 11/2000 | Thadiwe et al. | |
| 6,339,758 B1 | 1/2002 | Kanazawa et al. | |
| 6,362,690 B1 | 3/2002 | Tichauer | |
| 6,373,439 B1 | 4/2002 | Zurcher et al. | |
| 6,400,702 B1 | 6/2002 | Meier | |
| 6,560,444 B1 | 5/2003 | Imberg | |
| 6,594,508 B1 | 7/2003 | Ketonen | |
| 6,674,291 B1 | 1/2004 | Barber et al. | |
| 6,879,942 B1 | 4/2005 | Nagase et al. | |
| 6,927,555 B2 | 8/2005 | Johnson | |
| 6,937,980 B2 | 8/2005 | Krasny et al. | |
| 7,019,702 B2 | 3/2006 | Henriet et al. | |
| 7,142,884 B2 | 11/2006 | Hagn | |
| 7,199,754 B2 | 4/2007 | Krumm et al. | |
| 7,202,734 B1 | 4/2007 | Raab | |
| 7,202,815 B2 | 4/2007 | Swope et al. | |
| 7,224,992 B2 | 5/2007 | Patino et al. | |
| 7,254,420 B1 | 8/2007 | Klein | |
| 7,260,366 B2 | 8/2007 | Lee et al. | |
| 7,359,504 B1 | 4/2008 | Reuss et al. | |
| 7,400,907 B2 | 7/2008 | Jin et al. | |
| 7,433,661 B2 | 10/2008 | Kogiantis et al. | |
| 7,436,896 B2 | 10/2008 | Hottinen et al. | |
| 7,440,731 B2 | 10/2008 | Staudinger et al. | |
| 7,471,963 B2 | 12/2008 | Kim et al. | |
| 7,486,931 B2 | 2/2009 | Cho et al. | |
| 7,504,833 B1 | 3/2009 | Sequine | |
| 7,599,420 B2 | 10/2009 | Forenza et al. | |
| 7,620,432 B2 | 11/2009 | Willins et al. | |
| D606,958 S | 12/2009 | Knoppert et al. | |
| 7,639,660 B2 | 12/2009 | Kim et al. | |
| 7,643,642 B2 | 1/2010 | Patino et al. | |
| 7,649,831 B2 | 1/2010 | Van Rensburg et al. | |
| 7,664,200 B2 | 2/2010 | Ariyavisitakul et al. | |
| 7,746,943 B2 | 6/2010 | Yamaura | |
| 7,760,681 B1 | 7/2010 | Chhabra | |
| 7,773,535 B2 | 8/2010 | Vook et al. | |
| 7,773,685 B2 | 8/2010 | Tirkkonen et al. | |
| 7,813,696 B2 | 10/2010 | Kim | |
| 7,822,140 B2 | 10/2010 | Catreux et al. | |
| 7,835,711 B2 | 11/2010 | McFarland | |
| 7,839,201 B2 | 11/2010 | Jacobson | |
| 7,864,969 B1 | 1/2011 | Ma et al. | |
| 7,885,211 B2 | 2/2011 | Shen et al. | |
| 7,936,237 B2 | 5/2011 | Park et al. | |
| 7,940,740 B2 | 5/2011 | Krishnamurthy et al. | |
| 7,942,936 B2 | 5/2011 | Golden | |
| 7,945,229 B2 | 5/2011 | Wilson et al. | |
| 7,983,722 B2 | 7/2011 | Lowles et al. | |
| 8,014,455 B2 | 9/2011 | Kim et al. | |
| 8,072,285 B2 | 12/2011 | Spears et al. | |
| 8,094,011 B2 | 1/2012 | Faris et al. | |
| 8,095,081 B2 | 1/2012 | Vance | |
| 8,098,120 B2 | 1/2012 | Steeneken et al. | |
| 8,155,683 B2 | 4/2012 | Buckley et al. | |
| 8,204,446 B2 | 6/2012 | Scheer et al. | |
| 8,219,336 B2 | 7/2012 | Hoebel et al. | |
| 8,219,337 B2 | 7/2012 | Hoebel et al. | |
| 8,232,685 B2 | 7/2012 | Perper et al. | |
| 8,233,851 B2 | 7/2012 | Jeon et al. | |
| 8,244,317 B2 | 8/2012 | Knoppert et al. | |
| 8,259,431 B2 | 9/2012 | Katta | |
| 8,275,327 B2 | 9/2012 | Yi et al. | |
| 8,280,038 B2 | 10/2012 | Johnson et al. | |
| 8,280,323 B2 | 10/2012 | Thompson | |
| 8,284,849 B2 | 10/2012 | Lee et al. | |
| 8,302,183 B2 | 10/2012 | Sood | |
| 8,319,393 B2 | 11/2012 | DeReus | |
| 8,373,596 B1 | 2/2013 | Kimball et al. | |
| 8,374,633 B2 | 2/2013 | Frank et al. | |
| 8,384,695 B2 | 2/2013 | Lee et al. | |
| 8,428,022 B2 | 4/2013 | Frank et al. | |
| 8,460,961 B2 | 6/2013 | Guo et al. | |
| 8,483,707 B2 | 7/2013 | Krishnamurthy et al. | |
| 8,509,338 B2 | 8/2013 | Sayana et al. | |
| 8,542,776 B2 | 9/2013 | Kim et al. | |
| 8,588,426 B2 | 11/2013 | Xin et al. | |
| 8,594,584 B2 | 11/2013 | Greene et al. | |
| 8,606,200 B2 | 12/2013 | Ripley et al. | |
| 8,611,829 B2 | 12/2013 | Alberth et al. | |
| 8,620,348 B2 | 12/2013 | Shrivastava et al. | |
| 8,626,083 B2 | 1/2014 | Greene et al. | |
| 8,712,340 B2 | 4/2014 | Hoirup et al. | |
| 8,712,355 B2 | 4/2014 | Black et al. | |
| 8,731,496 B2 | 5/2014 | Drogi et al. | |
| 8,761,296 B2 | 6/2014 | Zhang et al. | |
| 8,767,722 B2 * | 7/2014 | Kamble et al. | 370/360 |
| 8,909,173 B2 | 12/2014 | Harmke | |
| 8,989,747 B2 | 3/2015 | Padden et al. | |
| 9,002,354 B2 | 4/2015 | Krishnamurthy et al. | |
| 9,031,523 B2 | 5/2015 | Anderson | |
| 9,197,255 B2 | 11/2015 | Pourkhaatoun et al. | |
| 9,203,489 B2 | 12/2015 | Sayana et al. | |
| 9,215,659 B2 | 12/2015 | Asrani et al. | |
| 9,241,050 B1 | 1/2016 | Asrani et al. | |
| 9,298,303 B2 | 3/2016 | Wagner et al. | |
| 9,301,177 B2 | 3/2016 | Ballantyne et al. | |
| 9,326,320 B2 | 4/2016 | Hong et al. | |
| 9,344,837 B2 | 5/2016 | Russel et al. | |
| 9,386,542 B2 | 7/2016 | Russell et al. | |
| 9,401,750 B2 | 7/2016 | Sayana et al. | |
| 9,413,409 B2 | 8/2016 | Black et al. | |
| 9,478,847 B2 | 10/2016 | Russell et al. | |
| 9,491,007 B2 | 11/2016 | Black et al. | |
| 9,549,290 B2 | 1/2017 | Smith | |
| 2001/0034238 A1 | 10/2001 | Voyer | |
| 2002/0037742 A1 | 3/2002 | Enderlein et al. | |
| 2002/0057751 A1 | 5/2002 | Jagger et al. | |
| 2002/0090974 A1 | 7/2002 | Hagn | |
| 2002/0138254 A1 | 9/2002 | Isaka et al. | |
| 2002/0149351 A1 | 10/2002 | Kanekawa et al. | |
| 2002/0193130 A1 | 12/2002 | Yang et al. | |
| 2003/0143961 A1 | 7/2003 | Humphreys et al. | |
| 2003/0161485 A1 | 8/2003 | Smith | |
| 2003/0222819 A1 | 12/2003 | Karr et al. | |
| 2004/0051583 A1 | 3/2004 | Hellberg | |
| 2004/0052314 A1 | 3/2004 | Copeland | |
| 2004/0052317 A1 | 3/2004 | Love et al. | |
| 2004/0057530 A1 | 3/2004 | Tarokh et al. | |
| 2004/0063439 A1 | 4/2004 | Glazko et al. | |
| 2004/0082356 A1 | 4/2004 | Walton et al. | |
| 2004/0106428 A1 | 6/2004 | Shoji | |
| 2004/0148333 A1 * | 7/2004 | Manion et al. | 709/201 |
| 2004/0176125 A1 | 9/2004 | Lee | |
| 2004/0178912 A1 | 9/2004 | Smith et al. | |
| 2004/0192398 A1 | 9/2004 | Zhu | |
| 2004/0198392 A1 | 10/2004 | Harvey et al. | |
| 2004/0235433 A1 | 11/2004 | Hugl et al. | |
| 2004/0246048 A1 | 12/2004 | Leyonhjelm et al. | |
| 2005/0037733 A1 | 2/2005 | Coleman et al. | |
| 2005/0041018 A1 | 2/2005 | Philipp | |
| 2005/0049864 A1 | 3/2005 | Kaltenmeier et al. | |
| 2005/0075123 A1 | 4/2005 | Jin et al. | |

(56) References Cited

U.S. PATENT DOCUMENTS

| | | |
|---|---|---|
| 2005/0085195 A1 | 4/2005 | Tong et al. |
| 2005/0124393 A1 | 6/2005 | Nuovo et al. |
| 2005/0134456 A1 | 6/2005 | Niu et al. |
| 2005/0135324 A1 | 6/2005 | Kim et al. |
| 2005/0136845 A1 | 6/2005 | Masuoka et al. |
| 2005/0208952 A1 | 9/2005 | Dietrich et al. |
| 2005/0227640 A1 | 10/2005 | Haque et al. |
| 2005/0250532 A1 | 11/2005 | Hwang et al. |
| 2006/0019677 A1 | 1/2006 | Teague et al. |
| 2006/0052131 A1 | 3/2006 | Ichihara |
| 2006/0067277 A1 | 3/2006 | Thomas et al. |
| 2006/0077952 A1* | 4/2006 | Kubsch et al. ............... 370/351 |
| 2006/0099940 A1 | 5/2006 | Pfleging et al. |
| 2006/0103635 A1 | 5/2006 | Park |
| 2006/0181453 A1 | 8/2006 | King et al. |
| 2006/0194593 A1 | 8/2006 | Drabeck et al. |
| 2006/0207806 A1 | 9/2006 | Philipp |
| 2006/0209754 A1 | 9/2006 | Ji et al. |
| 2006/0215618 A1 | 9/2006 | Soliman et al. |
| 2006/0240827 A1 | 10/2006 | Dunn |
| 2006/0245601 A1 | 11/2006 | Michaud et al. |
| 2006/0256887 A1 | 11/2006 | Kwon et al. |
| 2006/0280261 A1 | 12/2006 | Prikhodko et al. |
| 2006/0291393 A1 | 12/2006 | Teague et al. |
| 2006/0292990 A1 | 12/2006 | Karabinis et al. |
| 2007/0004344 A1 | 1/2007 | DeGroot et al. |
| 2007/0008108 A1 | 1/2007 | Schurig et al. |
| 2007/0026838 A1 | 2/2007 | Staudinger et al. |
| 2007/0042714 A1 | 2/2007 | Ayed |
| 2007/0049280 A1 | 3/2007 | Sambhwani et al. |
| 2007/0069735 A1 | 3/2007 | Graf et al. |
| 2007/0091004 A1 | 4/2007 | Puuri |
| 2007/0093281 A1 | 4/2007 | Park et al. |
| 2007/0133462 A1 | 6/2007 | Guey |
| 2007/0153743 A1 | 7/2007 | Mukkavilli et al. |
| 2007/0197180 A1 | 8/2007 | McKinzie et al. |
| 2007/0200766 A1 | 8/2007 | McKinzie et al. |
| 2007/0211657 A1 | 9/2007 | McBeath et al. |
| 2007/0211813 A1 | 9/2007 | Talwar et al. |
| 2007/0222629 A1 | 9/2007 | Yoneyama |
| 2007/0223422 A1 | 9/2007 | Kim et al. |
| 2007/0232370 A1 | 10/2007 | Kim et al. |
| 2007/0238425 A1 | 10/2007 | McFarland |
| 2007/0238496 A1 | 10/2007 | Chung et al. |
| 2007/0243894 A1 | 10/2007 | Das et al. |
| 2007/0255558 A1 | 11/2007 | Yasunaga et al. |
| 2007/0280160 A1 | 12/2007 | Kim et al. |
| 2007/0285326 A1 | 12/2007 | McKinzie |
| 2008/0001915 A1 | 1/2008 | Pihlaja et al. |
| 2008/0002735 A1 | 1/2008 | Poirier et al. |
| 2008/0014960 A1 | 1/2008 | Chou |
| 2008/0026710 A1 | 1/2008 | Buckley |
| 2008/0059188 A1 | 3/2008 | Konopka et al. |
| 2008/0080449 A1 | 4/2008 | Huang et al. |
| 2008/0089312 A1 | 4/2008 | Malladi |
| 2008/0095109 A1 | 4/2008 | Malladi et al. |
| 2008/0108310 A1 | 5/2008 | Tong et al. |
| 2008/0111714 A1 | 5/2008 | Kremin |
| 2008/0117886 A1 | 5/2008 | Kim |
| 2008/0130626 A1 | 6/2008 | Ventola et al. |
| 2008/0132247 A1 | 6/2008 | Anderson |
| 2008/0133462 A1 | 6/2008 | Aylward et al. |
| 2008/0157893 A1 | 7/2008 | Krah |
| 2008/0159239 A1 | 7/2008 | Odlyzko et al. |
| 2008/0165876 A1 | 7/2008 | Suh et al. |
| 2008/0167040 A1 | 7/2008 | Khandekar et al. |
| 2008/0167073 A1 | 7/2008 | Hobson et al. |
| 2008/0170602 A1 | 7/2008 | Guey |
| 2008/0170608 A1 | 7/2008 | Guey |
| 2008/0186105 A1 | 8/2008 | Scuderi et al. |
| 2008/0192683 A1 | 8/2008 | Han et al. |
| 2008/0212520 A1 | 9/2008 | Chen et al. |
| 2008/0225693 A1 | 9/2008 | Zhang et al. |
| 2008/0227414 A1 | 9/2008 | Karmi et al. |
| 2008/0227481 A1 | 9/2008 | Naguib et al. |
| 2008/0232395 A1 | 9/2008 | Buckley et al. |
| 2008/0267310 A1 | 10/2008 | Khan et al. |
| 2008/0274753 A1 | 11/2008 | Attar et al. |
| 2008/0279300 A1 | 11/2008 | Walker et al. |
| 2008/0298482 A1 | 12/2008 | Rensburg et al. |
| 2008/0307427 A1 | 12/2008 | Pi et al. |
| 2008/0309633 A1 | 12/2008 | Hotelling et al. |
| 2008/0312918 A1 | 12/2008 | Kim |
| 2008/0313146 A1 | 12/2008 | Wong et al. |
| 2008/0317259 A1 | 12/2008 | Zhang et al. |
| 2009/0041151 A1 | 2/2009 | Khan et al. |
| 2009/0055170 A1 | 2/2009 | Nagahama |
| 2009/0059783 A1 | 3/2009 | Walker et al. |
| 2009/0061790 A1 | 3/2009 | Rofougaran |
| 2009/0061887 A1 | 3/2009 | Hart et al. |
| 2009/0067382 A1 | 3/2009 | Li et al. |
| 2009/0091551 A1 | 4/2009 | Hotelling et al. |
| 2009/0102294 A1 | 4/2009 | Hodges et al. |
| 2009/0121963 A1 | 5/2009 | Greene |
| 2009/0122758 A1 | 5/2009 | Smith et al. |
| 2009/0122884 A1 | 5/2009 | Vook et al. |
| 2009/0228598 A1 | 9/2009 | Stamoulis et al. |
| 2009/0238131 A1 | 9/2009 | Montojo et al. |
| 2009/0243631 A1 | 10/2009 | Kuang |
| 2009/0252077 A1 | 10/2009 | Khandekar et al. |
| 2009/0256644 A1 | 10/2009 | Knudsen et al. |
| 2009/0258614 A1 | 10/2009 | Walker |
| 2009/0262699 A1 | 10/2009 | Wdngerter et al. |
| 2009/0264078 A1 | 10/2009 | Yun et al. |
| 2009/0268675 A1 | 10/2009 | Choi |
| 2009/0270103 A1 | 10/2009 | Pani et al. |
| 2009/0285321 A1 | 11/2009 | Schulz et al. |
| 2009/0290544 A1 | 11/2009 | Yano et al. |
| 2009/0295226 A1 | 12/2009 | Hodges et al. |
| 2009/0298433 A1 | 12/2009 | Sorrells et al. |
| 2009/0307511 A1 | 12/2009 | Fiennes et al. |
| 2009/0323608 A1 | 12/2009 | Adachi et al. |
| 2010/0002657 A1 | 1/2010 | Teo et al. |
| 2010/0014690 A1 | 1/2010 | Wolff et al. |
| 2010/0023898 A1 | 1/2010 | Nomura et al. |
| 2010/0034312 A1 | 2/2010 | Muharemovic et al. |
| 2010/0035627 A1 | 2/2010 | Hou et al. |
| 2010/0046460 A1 | 2/2010 | Kwak et al. |
| 2010/0046650 A1 | 2/2010 | Jongren et al. |
| 2010/0046763 A1 | 2/2010 | Homma |
| 2010/0056166 A1 | 3/2010 | Tenny |
| 2010/0081487 A1 | 4/2010 | Chen et al. |
| 2010/0085010 A1 | 4/2010 | Suzuki et al. |
| 2010/0092007 A1 | 4/2010 | Sun |
| 2010/0103949 A1 | 4/2010 | Jung et al. |
| 2010/0106459 A1* | 4/2010 | Bakalov .................. 702/182 |
| 2010/0109796 A1 | 5/2010 | Park et al. |
| 2010/0118706 A1 | 5/2010 | Parkvall et al. |
| 2010/0118839 A1 | 5/2010 | Malladi et al. |
| 2010/0156728 A1 | 6/2010 | Alvey et al. |
| 2010/0157858 A1 | 6/2010 | Lee et al. |
| 2010/0157924 A1 | 6/2010 | Prasad et al. |
| 2010/0159833 A1 | 6/2010 | Lewis et al. |
| 2010/0161658 A1 | 6/2010 | Hamynen et al. |
| 2010/0165882 A1 | 7/2010 | Palanki et al. |
| 2010/0167743 A1 | 7/2010 | Palanki et al. |
| 2010/0172310 A1 | 7/2010 | Cheng et al. |
| 2010/0172311 A1 | 7/2010 | Agrawal et al. |
| 2010/0182903 A1 | 7/2010 | Palanki et al. |
| 2010/0189191 A1 | 7/2010 | Taoka et al. |
| 2010/0195566 A1 | 8/2010 | Krishnamurthy et al. |
| 2010/0208838 A1 | 8/2010 | Lee et al. |
| 2010/0217590 A1 | 8/2010 | Nemer et al. |
| 2010/0220801 A1 | 9/2010 | Lee et al. |
| 2010/0260154 A1 | 10/2010 | Frank et al. |
| 2010/0271330 A1 | 10/2010 | Philipp |
| 2010/0272094 A1 | 10/2010 | Byard et al. |
| 2010/0274516 A1 | 10/2010 | Hoebel et al. |
| 2010/0291918 A1 | 11/2010 | Suzuki et al. |
| 2010/0311437 A1 | 12/2010 | Palanki et al. |
| 2010/0317343 A1 | 12/2010 | Krishnamurthy |
| 2010/0322176 A1 | 12/2010 | Chen et al. |
| 2010/0323718 A1 | 12/2010 | Jen |
| 2011/0039583 A1 | 2/2011 | Frank et al. |

(56) References Cited

U.S. PATENT DOCUMENTS

| | | |
|---|---|---|
| 2011/0051834 A1 | 3/2011 | Lee et al. |
| 2011/0080969 A1 | 4/2011 | Jongren et al. |
| 2011/0083066 A1 | 4/2011 | Chung et al. |
| 2011/0085588 A1 | 4/2011 | Zhuang |
| 2011/0085610 A1 | 4/2011 | Zhuang et al. |
| 2011/0096739 A1 | 4/2011 | Heidari et al. |
| 2011/0096915 A1 | 4/2011 | Nemer |
| 2011/0103498 A1 | 5/2011 | Chen et al. |
| 2011/0105023 A1 | 5/2011 | Scheer |
| 2011/0116423 A1 | 5/2011 | Rousu et al. |
| 2011/0116436 A1 | 5/2011 | Bachu et al. |
| 2011/0117925 A1 | 5/2011 | Sampath et al. |
| 2011/0119005 A1 | 5/2011 | Majima et al. |
| 2011/0121836 A1 | 5/2011 | Kim et al. |
| 2011/0143770 A1 | 6/2011 | Charbit et al. |
| 2011/0143773 A1 | 6/2011 | Kangas et al. |
| 2011/0148625 A1 | 6/2011 | Velusamy |
| 2011/0148700 A1 | 6/2011 | Lasagabaster et al. |
| 2011/0149868 A1 | 6/2011 | Krishnamurthy et al. |
| 2011/0149903 A1 | 6/2011 | Krishnamurthy et al. |
| 2011/0157067 A1 | 6/2011 | Wagner et al. |
| 2011/0158200 A1 | 6/2011 | Bachu et al. |
| 2011/0176252 A1 | 7/2011 | DeReus |
| 2011/0189964 A1 | 8/2011 | Jeon et al. |
| 2011/0190016 A1 | 8/2011 | Hamabe et al. |
| 2011/0216840 A1 | 9/2011 | Lee et al. |
| 2011/0244884 A1 | 10/2011 | Kangas et al. |
| 2011/0249637 A1 | 10/2011 | Hammarwall et al. |
| 2011/0250852 A1 | 10/2011 | Greene |
| 2011/0263303 A1 | 10/2011 | Lowles et al. |
| 2011/0268101 A1 | 11/2011 | Wang |
| 2011/0274188 A1 | 11/2011 | Sayana et al. |
| 2011/0281532 A1 | 11/2011 | Shin et al. |
| 2011/0285603 A1 | 11/2011 | Skarp |
| 2011/0286349 A1 | 11/2011 | Tee et al. |
| 2011/0292844 A1 | 12/2011 | Kwun et al. |
| 2011/0319027 A1 | 12/2011 | Sayana |
| 2012/0002609 A1 | 1/2012 | Larsson et al. |
| 2012/0008510 A1 | 1/2012 | Cai et al. |
| 2012/0021769 A1 | 1/2012 | Lindoff et al. |
| 2012/0032646 A1 | 2/2012 | Lee |
| 2012/0039251 A1 | 2/2012 | Sayana |
| 2012/0050122 A1 | 3/2012 | Wu et al. |
| 2012/0052903 A1 | 3/2012 | Han et al. |
| 2012/0071195 A1 | 3/2012 | Chakraborty et al. |
| 2012/0076043 A1 | 3/2012 | Nishio et al. |
| 2012/0077538 A1 | 3/2012 | Yun |
| 2012/0106475 A1 | 5/2012 | Jung |
| 2012/0112851 A1 | 5/2012 | Manssen et al. |
| 2012/0120772 A1 | 5/2012 | Fujisawa |
| 2012/0120934 A1 | 5/2012 | Cho |
| 2012/0122478 A1 | 5/2012 | Siomina et al. |
| 2012/0128175 A1 | 5/2012 | Visser et al. |
| 2012/0158839 A1 | 6/2012 | Hassan et al. |
| 2012/0161927 A1 | 6/2012 | Pierfelice et al. |
| 2012/0162129 A1 | 6/2012 | Krah et al. |
| 2012/0170541 A1 | 7/2012 | Love et al. |
| 2012/0177089 A1 | 7/2012 | Pelletier et al. |
| 2012/0178370 A1 | 7/2012 | George |
| 2012/0182144 A1 | 7/2012 | Richardson et al. |
| 2012/0206556 A1 | 8/2012 | Yu et al. |
| 2012/0214412 A1 | 8/2012 | Schlub et al. |
| 2012/0214421 A1 | 8/2012 | Hoirup et al. |
| 2012/0214549 A1 | 8/2012 | Philbin |
| 2012/0220243 A1 | 8/2012 | Mendolia |
| 2012/0224715 A1 | 9/2012 | Kikkeri |
| 2012/0295554 A1 | 11/2012 | Greene et al. |
| 2012/0295555 A1 | 11/2012 | Greene et al. |
| 2012/0302188 A1 | 11/2012 | Sahota et al. |
| 2012/0306716 A1 | 12/2012 | Satake et al. |
| 2012/0309388 A1 | 12/2012 | Moosavi et al. |
| 2012/0309413 A1 | 12/2012 | Grosman et al. |
| 2012/0316967 A1 | 12/2012 | Mgrdechian et al. |
| 2013/0030803 A1 | 1/2013 | Liao |
| 2013/0034241 A1 | 2/2013 | Pandey et al. |
| 2013/0039284 A1 | 2/2013 | Marinier et al. |
| 2013/0040578 A1 | 2/2013 | Khoshnevis et al. |
| 2013/0059600 A1 | 3/2013 | Elsom-Cook et al. |
| 2013/0078980 A1 | 3/2013 | Saito |
| 2013/0596000 A1 | 3/2013 | Elson-Cook et al. |
| 2013/0094484 A1* | 4/2013 | Kneckt ............... H04W 4/02 370/338 |
| 2013/0109314 A1* | 5/2013 | Kneckt ............... H04W 4/008 455/41.2 |
| 2013/0109334 A1 | 5/2013 | Kwon et al. |
| 2013/0142113 A1 | 6/2013 | Fong et al. |
| 2013/0150092 A1 | 6/2013 | Frank et al. |
| 2013/0178175 A1 | 7/2013 | Kato |
| 2013/0194154 A1 | 8/2013 | Baliarda et al. |
| 2013/0195283 A1 | 8/2013 | Larson et al. |
| 2013/0195296 A1 | 8/2013 | Merks |
| 2013/0286937 A1 | 10/2013 | Liu et al. |
| 2013/0307735 A1 | 11/2013 | Contreras et al. |
| 2013/0310102 A1 | 11/2013 | Chao et al. |
| 2013/0316687 A1 | 11/2013 | Subbaramoo et al. |
| 2013/0322375 A1 | 12/2013 | Chang et al. |
| 2013/0322562 A1 | 12/2013 | Zhang et al. |
| 2013/0322655 A1 | 12/2013 | Schuldt et al. |
| 2013/0325149 A1 | 12/2013 | Manssen et al. |
| 2014/0024321 A1 | 1/2014 | Zhu et al. |
| 2014/0044126 A1* | 2/2014 | Sabhanatarajan et al. ... 370/354 |
| 2014/0045422 A1* | 2/2014 | Qi ............... H04W 76/023 455/39 |
| 2014/0068288 A1 | 3/2014 | Robinson et al. |
| 2014/0092830 A1 | 4/2014 | Chen et al. |
| 2014/0093091 A1 | 4/2014 | Dusan et al. |
| 2014/0177686 A1 | 6/2014 | Greene et al. |
| 2014/0185498 A1 | 7/2014 | Schwent et al. |
| 2014/0227981 A1 | 8/2014 | Pecen et al. |
| 2014/0273882 A1 | 9/2014 | Asrani et al. |
| 2014/0273886 A1 | 9/2014 | Black et al. |
| 2014/0313088 A1 | 10/2014 | Rozenblit et al. |
| 2014/0349593 A1 | 11/2014 | Danak et al. |
| 2014/0376652 A1 | 12/2014 | Sayana et al. |
| 2014/0379332 A1 | 12/2014 | Rodriguez et al. |
| 2015/0017978 A1 | 1/2015 | Hong et al. |
| 2015/0024786 A1 | 1/2015 | Asrani et al. |
| 2015/0031420 A1 | 1/2015 | Higaki et al. |
| 2015/0072632 A1 | 3/2015 | Pourkhaatoun et al. |
| 2015/0080047 A1 | 3/2015 | Russell et al. |
| 2015/0092954 A1 | 4/2015 | Coker et al. |
| 2015/0171919 A1 | 6/2015 | Ballantyne et al. |
| 2015/0181388 A1 | 6/2015 | Smith |
| 2015/0236828 A1 | 8/2015 | Park et al. |
| 2015/0245323 A1 | 8/2015 | You et al. |
| 2015/0280674 A1 | 10/2015 | Langer et al. |
| 2015/0280675 A1 | 10/2015 | Langer et al. |
| 2015/0280876 A1 | 10/2015 | You et al. |
| 2015/0312058 A1 | 10/2015 | Black et al. |
| 2015/0349410 A1 | 12/2015 | Russell et al. |
| 2015/0365065 A1 | 12/2015 | Higaki et al. |
| 2016/0014727 A1 | 1/2016 | Nimbalker |
| 2016/0036482 A1 | 2/2016 | Black et al. |
| 2016/0080053 A1 | 3/2016 | Sayana et al. |

FOREIGN PATENT DOCUMENTS

| | | |
|---|---|---|
| CN | 1984476 | 6/2007 |
| CN | 101035379 | 9/2007 |
| CN | 102638609 | 8/2012 |
| CN | 102664861 | 9/2012 |
| DE | 10053205 | 5/2002 |
| DE | 10118189 | 11/2002 |
| EP | 0695059 | 1/1996 |
| EP | 1158686 | 11/2001 |
| EP | 1298809 | 4/2003 |
| EP | 1357543 | 10/2003 |
| EP | 1511010 | 3/2005 |
| EP | 1753152 | 2/2007 |
| EP | 1443791 | 2/2009 |
| EP | 2487967 | 8/2012 |
| EP | 2255443 | 11/2012 |
| EP | 2557433 | 2/2013 |
| EP | 2568531 | 3/2013 |

(56) References Cited

FOREIGN PATENT DOCUMENTS

| | | |
|---|---|---|
| EP | 2590258 | 5/2013 |
| JP | H09247852 | 9/1997 |
| JP | 2000286924 | 10/2000 |
| KR | 20050058333 | 6/2005 |
| RU | 2005113251 | 1/2006 |
| WO | WO-9306682 | 4/1993 |
| WO | WO-9416517 | 7/1994 |
| WO | WO-9600401 | 1/1996 |
| WO | WO-9921389 | 4/1999 |
| WO | WO-9950968 | 10/1999 |
| WO | WO-0111721 | 2/2001 |
| WO | WO-03007508 | 1/2003 |
| WO | WO-03107327 | 12/2003 |
| WO | WO-2004021634 | 3/2004 |
| WO | WO-2004040800 | 5/2004 |
| WO | WO-2004084427 | 9/2004 |
| WO | WO-2004084447 | 9/2004 |
| WO | WO-2006039434 | 4/2006 |
| WO | WO-2006046192 | 5/2006 |
| WO | WO-2006130278 | 12/2006 |
| WO | WO-2007052115 | 5/2007 |
| WO | WO-2007080727 | 7/2007 |
| WO | WO-2008027705 | 3/2008 |
| WO | WO-2008033117 | 3/2008 |
| WO | WO-2008085107 | 7/2008 |
| WO | WO-2008085416 | 7/2008 |
| WO | WO-2008085720 | 7/2008 |
| WO | WO-2008112849 | 9/2008 |
| WO | WO-2008113210 | 9/2008 |
| WO | WO-2008137354 | 11/2008 |
| WO | WO-2008137607 | 11/2008 |
| WO | WO-2008156081 | 12/2008 |
| WO | WO-2009107090 | 9/2009 |
| WO | WO-2010080845 | 7/2010 |
| WO | WO-2010124244 | 10/2010 |
| WO | WO-2010138039 | 12/2010 |
| WO | WO-2012115649 | 8/2012 |
| WO | WO-2012149968 | 11/2012 |
| WO | WO-2012177939 | 12/2012 |
| WO | WO-2013131268 | 9/2013 |

OTHER PUBLICATIONS

WiFi Alliance, "Marketing Statement of Work Neighbor Awareness Networking", Version 1.17 proposal, Neighbor Awareness Networking Task Group,May 30, 2012, all pages.
"International Search Report and Written Opinion", Application No. PCT/US2013/072718, Jun. 18, 2014, 12 pages.
Yun,"Distributed Self-Pruning(DSP) Algorithm for Bridges in Clustered Ad Hoc Networks", Embedded Software and Systems; Lecture Notes in Computer Science, Springer, May 14, 2007, pp. 699-707.
"3rd Generation Partnership Project; Technical Specification Group Radio Access Network", 3GPP TR 36.814 V9.0.0 (Mar. 2010), Further Advancements for E-UTRA Physical Layer Aspects (Release 9), Mar. 2010, 104 pages.
"A feedback framework based on W2W1 for Rei. 10", 3GPP TSG RAN WG1 #61bis, R1-103664,, Jun. 2010, 19 pages.
"Addition of PRS Muting Configuration Information to LPPa", 3GPP TSG RAN3 #68, Montreal, Canada; Ericsson, R3-101526, May 2010, 7 pages.
"Advisory Action", U.S. Appl. No. 12/650,699, Jan. 30, 2013, 3 pages.
"Advisory Action", U.S. Appl. No. 12/650,699, Sep. 25, 2014, 3 pages.
"An-1432 the LM4935 Headset and Push-Button Detection Guide", Texas Instruments Incorporated—http://www.ti.com/lit/an/snaa024a.snaa024a.pdf, May 2013, 8 pages.
"Best Companion' reporting for improved single- cell MU-MIMO pairing", 3GPP TSG RAN WG1 #56; Athens, Greece; Alcatei-Lucent, R1-090926, Feb. 2009, 5 pages.

"Change Request—Clarification of the CP length of empty OFDM symbols in PRS subframes", 3GPP TSG RAN WG1 #59bis, Jeju, Vaiencia, Spain, ST-Ericsson, Motorola, Qualcomm Inc, R1-100311; Jan. 2009, 2 pages.
"Change Request 36.211—Introduction of L TE Positioning", 3GPP TSG RAN WG1 #59, Jeju, South Korea; Ericsson, R1-095027, May 2010, 6 pages.
"Change Request 36.213 Clarification of POSCH and PRS in combination for L TE positioning", 3GPP TSG RAN WG1 #58bis, Miyazaki, Japan; Ericsson, et al., R1-094262; Oct. 2009, 4 pages.
"Change Request 36.214—Introduction of LTE Positioning", 3GPP TSG RAN WG1 #59, Jeju, South Korea, Ericsson, et al., R1-094430, Nov. 2009, 4 pages.
"Companion Subset Based PMI/CQI Feedback for LTE-A MU-MIMO", 3GPP TSG RAN WG1 #60; San Francisco, USA, RIM; R1-101104, Feb. 2010, 8 pages.
"Comparison of PMI-based and SCF-based MU-MIMO", 3GPP TSG RAN1 #58; Shenzhen, China; R1-093421 Aug. 2009, 5 pages.
"Development of two-stage feedback framework for Rel-10", 3GPP TSG RAN WG1 #60bis Meeting, R1-101859, Alcatel-Lucent Shanghai Bell, Alcatel-Lucent, Apr. 2010, 5 pages.
"Digital cellular telecommunications system (Phase 2+)", Location Services (LCS); Broadcast Network Assistance for Enhanced Observed Time Difference (E-OTD) and Global Positioning System (GPS) Positioning Methods (3GPP TS 04.35 version 8.3.0 Release 1999), 2001, 37 pages.
"Discussions on UE positioning issues", 3GPP TSG-RAN WG1 #57 R1-091911, San Francisco, USA,, May 2009, 12 pages.
"DL Codebook design for 8Tx preceding", 3GPP TSG RAN WG1 #60bis, R1-102380, LG Electronics, Beijing, China, Apr. 2010, 4 pages.
"Double codebook design principles", 3GPP TSG RAN WG1 #61bis, R1-103804, Nokia, Nokia Siemens Networks, Dresden, Germany, Jun. 2010, 9 pages.
"Earbud with Push-to-Talk Microphone", Motorola, Inc., model 53727, iDEN 2.5 mm 4-pole mono PTT headset NNTNN5006BP, 2013, 10 pages.
"Evaluation of protocol architecture alternatives for positioning", 3GPP TSG-RAN WG2 #66bis R2-093855, Los Angeles, CA, USA, Jun. 2009, 4 pages.
"Ex Parte Quayle Action", U.S. Appl. No. 13/088,237, Dec. 19, 2012, 5 pages.
"Extended European Search Report", EP Application No. 12196319.3, Feb. 27, 2014, 7 pages.
"Extended European Search Report", EP Application No. 12196328.4, Feb. 26, 2014, 7 pages.
"Extensions to Rel-8 type CQI/PMI/RI feedback using double codebook structure", 3GPP TSG RAN WG1#59bis, R1-100251, Valencia, Spain Jan. 2010, 4 pages.
"Feedback Codebook Design and Performance Evaluation", 3GPP TSG RAN WG1 #61bis, R1-103970, LG Electronics, Jun. 2010, 6 pages.
"Feedback considerations for DL MIMO and CoMP", 3GPP TSG RAN WG1 #57bis; Los Angeles, USA; Qualcomm Europe; R1-092695, Jun. 2009, 6 pages.
"Final Improvement Proposal for PTT Support in HFP", Bluetooth SIG, Inc., revision V10r00 (PTTinHFP_FIPD), Jul. 20, 2010, 50 pages.
"Final Office Action", U.S. Appl. No. 12/407,783, Feb. 15, 2012, 18 pages.
"Final Office Action", U.S. Appl. No. 12/573,456, Mar. 21, 2012, 12 pages.
"Final Office Action", U.S. Appl. No. 12/650,699, Jul. 16, 2014, 20 pages.
"Final Office Action", U.S. Appl. No. 12/650,699, Jul. 29, 2015, 26 pages.
"Final Office Action", U.S. Appl. No. 12/650,699, Nov. 13, 2012, 17 pages.
"Final Office Action", U.S. Appl. No. 12/756,777, Nov. 1, 2013, 12 pages.
"Final Office Action", U.S. Appl. No. 12/899,211, Oct. 24, 2013, 17 pages.

(56) References Cited

OTHER PUBLICATIONS

"Final Office Action", U.S. Appl. No. 13/477,609, Jul. 31, 2015, 11 pages.
"Final Office Action", U.S. Appl. No. 13/733,297, Jul. 22, 2015, 20 pages.
"Final Office Action", U.S. Appl. No. 13/873,557, Jul. 17, 2015, 13 pages.
"Final Office Action", U.S. Appl. No. 14/012,050, Jul. 6, 2015, 23 pages.
"Final Office Action", U.S. Appl. No. 14/052,903, Oct. 1, 2015, 10 pages.
"Final Office Action", U.S. Appl. No. 14/280,775, Dec. 9, 2015, 13 pages.
"Foreign Office Action", CN Application No. 201080025882.7, Feb. 8, 2014, 19 pages.
"Further details on DL OTDOA", 3GPP TSG RAN WG1 #56bis, Seoul, South Korea—Ericsson, R1-091312 Mar. 2009, 6 pages.
"Further Refinements of Feedback Framework", 3GPP TSG-RAN WG1 #60bis R1-101742; Ericsson, ST-Ericsson, Apr. 2010, 8 pages.
"IEEE 802.16m System Description Document [Draft]", IEEE 802.16 Broadband Wireless Access Working Group, Nokia, Feb. 7, 2009, 171 pages.
"Implicit feedback in support of downlink MU-MIMO Texas Instruments", 3GPP TSG RAN WG1 #58; Shenzhen, China, R1-093176, Aug. 2009, 4 pages.
"Improving the hearability of LTE Positioning Service", 3GPP TSG RAN WG1 #55bis; Alcatel-Lucent, R1-090053,, Jan. 2009, 5 pages.
"Innovator in Electronics, Technical Update, Filters & Modules PRM Alignment", Module Business Unit, Apr. 2011, 95 pages.
"International Preliminary Report on Patentability", Application No. PCT/US2013/042042, Mar. 10, 2015, 8 pages.
"International Search Report and Written Opinion", Application No. PCT/US2014/060440, Feb. 5, 2015, 11 pages.
"International Search Report and Written Opinion", Application No. PCT/US2015/031328, Aug. 12, 2015, 11 pages.
"International Search Report and Written Opinion", Application No. PCT/US2014/045755, Oct. 23, 2014, 11 pages.
"International Search Report and Written Opinion", Application No. PCT/US2014/045956, Oct. 31, 2014, 11 pages.
"International Search Report and Written Opinion", Application No. PCT/US2014/056642, Dec. 9, 2014, 11 pages.
"International Search Report and Written Opinion", Application No. PCT/US2013/071615, Mar. 5, 2014, 13 pages.
"International Search Report and Written Opinion", Application No. PCT/US2013/040242, Oct. 4, 2013, 14 pages.
"International Search Report and Written Opinion", Application No. PCT/US2014/047233, Jan. 22, 2015, 8 pages.
"International Search Report and Written Opinion", Application No. PCT/US2013/077919, Apr. 24, 2014, 8 pages.
"International Search Report and Written Opinion", Application No. PCT/US2014/070925, May 11, 2015, 9 pages.
"International Search Report and Written Opinion", Application No. PCT/US2014/018564, Jun. 18, 2014, 11 pages.
"International Search Report and Written Opinion", Application No. PCT/US2015/027872, Jul. 15, 2015, 12 pages.
"International Search Report and Written Opinion", Application No. PCT/US2010/026579, Feb. 4, 2011, 13 pages.
"International Search Report and Written Opinion", Application No. PCT/US2011/034959, Aug. 16, 2011, 13 pages.
"International Search Report and Written Opinion", Application No. PCT/US2011/045209, Oct. 28, 2011, 14 pages.
"International Search Report and Written Opinion", Application No. PCT/US2011/039214, Sep. 14, 2011, 9 pages.
"International Search Report and Written Opinion", Application No. PCT/US2010/038257, Oct. 1, 2010, 9 pages.
"International Search Report and Written Opinion", Application No. PCT/US2010/034023, Dec. 1, 2010, 9 pages.
"International Search Report", Application No. PCT/US20013/071616, Mar. 5, 2014, 2 pages.
"International Search Report", Application No. PCT/US2010/030516, Oct. 8, 2010, 5 pages.
"International Search Report", Application No. PCT/US2010/036982, Nov. 22, 2010, 4 pages.
"International Search Report", Application No. PCT/US2010/041451, Oct. 25, 2010, 3 pages.
"International Search Report", Application No. PCT/US2011/044103, Oct. 24, 2011, 3 pages.
"International Search Report", Application No. PCT/US2014/014375, Apr. 7, 2014, 4 pages.
"Introduction of L TE Positioning", 3GPP TSG RAN WG1 #58, Shenzhen, China, R1-093604; Draft CR 36.213, Aug. 2009, 3 pages.
"Introduction of L TE Positioning", 3GPP TSG RAN WG1 #59, Jeju, South Korea, Ericsson et al.; R1-094429 Nov. 2009, 5 pages.
"Introduction of LTE Positioning", , 3GPP TSG RAN WG1 #58, Shenzhen, China; Draft CR 36.214; R1-093605;, Aug. 2009, 6 pages.
"Introduction of LTE Positioning", , 3GPP TSG-RAN WG1 Meeting #58, R1-093603, Shenzhen, China Aug. 2009, 5 pages.
"LS on 12 5. Assistance Information for OTDOA Positioning Support for L TE Rel-9", 3GPP TSG RAN WG1 Meeting #58; Shenzhen, China; R1-093729, Aug. 2009, 3 pages.
"LS on LTE measurement supporting Mobility", 3GPP TSG WG1 #48, Tdoc R1-071250; StLouis, USA, Feb. 2007, 2 pages.
"LTE Positioning Protocol (LPP)", 3GPP TS 36.355 V9.0.0 (Dec. 2009); 3rd Generation Partnership Project; Technical Specification Group Radio Access Network; Evolved Universal Terrestrial Radio Access (E-UTRA); Release 9, Dec. 2009, 102 pages.
"Method for Channel Quality Feedback in Wireless Communication Systems", U.S. Appl. No. 12/823,178, filed Jun. 25, 2010, 34 pages.
"Motorola SJYN0505A Stereo Push to Talk Headset for Nextel", Motorola Inc., iDEN 5-pole 2.5 mm Stereo Headset SJYN05058A, 2010, 2 pages.
"Non-Final Office Action", U.S. Appl. No. 12/407,783, Sep. 9, 2013, 16 pages.
"Non-Final Office Action", U.S. Appl. No. 12/407,783, Oct. 5, 2011, 14 pages.
"Non-Final Office Action", U.S. Appl. No. 12/480,289, Jun. 9, 2011, 20 pages.
"Non-Final Office Action", U.S. Appl. No. 12/492,339, Aug. 19, 2011, 13 pages.
"Non-Final Office Action", U.S. Appl. No. 12/542,374, Feb. 24, 2014, 25 pages.
"Non-Final Office Action", U.S. Appl. No. 12/542,374, Aug. 7, 2013, 22 pages.
"Non-Final Office Action", U.S. Appl. No. 12/542,374, Aug. 31, 2012, 27 pages.
"Non-Final Office Action", U.S. Appl. No. 12/542,374, Dec. 23, 2011, 22 pages.
"Non-Final Office Action", U.S. Appl. No. 12/573,456, Nov. 18, 2011, 9 pages.
"Non-Final Office Action", U.S. Appl. No. 12/577,553, Feb. 4, 2014, 10 pages.
"Non-Final Office Action", U.S. Appl. No. 12/577,553, Aug. 12, 2013, 11 pages.
"Non-Final Office Action", U.S. Appl. No. 12/577,553, Dec. 28, 2011, 7 pages.
"Non-Final Office Action", U.S. Appl. No. 12/650,699, Mar. 30, 2015, 28 pages.
"Non-Final Office Action", U.S. Appl. No. 12/650,699, Apr. 23, 2013, 19 pages.
"Non-Final Office Action", U.S. Appl. No. 12/650,699, Jul. 19, 2012, 12 pages.
"Non-Final Office Action", U.S. Appl. No. 12/650,699, Dec. 16, 2013, 26 pages.
"Non-Final Office Action", U.S. Appl. No. 12/756,777, Apr. 19, 2013, 17 pages.
"Non-Final Office Action", U.S. Appl. No. 12/813,221, Oct. 8, 2013, 10 pages.
"Non-Final Office Action", U.S. Appl. No. 12/823,178, Aug. 23, 2012, 15 pages.
"Non-Final Office Action", U.S. Appl. No. 12/899,211, Apr. 10, 2014, 12 pages.

(56) References Cited

OTHER PUBLICATIONS

"Non-Final Office Action", U.S. Appl. No. 12/899,211, May 22, 2013, 17 pages.
"Non-Final Office Action", U.S. Appl. No. 12/973,467, Mar. 28, 2013, 9 pages.
"Non-Final Office Action", U.S. Appl. No. 13/477,609, Dec. 3, 2014, 7 pages.
"Non-Final Office Action", U.S. Appl. No. 13/477,609, Dec. 14, 2015, 9 pages.
"Non-Final Office Action", U.S. Appl. No. 13/692,520, Sep. 5, 2014, 15 pages.
"Non-Final Office Action", U.S. Appl. No. 13/692,520, Oct. 5, 2015, 17 pages.
"Non-Final Office Action", U.S. Appl. No. 13/733,297, Mar. 13, 2015, 23 pages.
"Non-Final Office Action", U.S. Appl. No. 13/759,089, Apr. 18, 2013, 16 pages.
"Non-Final Office Action", U.S. Appl. No. 13/873,557, Mar. 11, 2015, 19 pages.
"Non-Final Office Action", U.S. Appl. No. 13/924,838, Nov. 28, 2014, 6 pages.
"Non-Final Office Action", U.S. Appl. No. 13/945,968, Apr. 28, 2015, 16 pages.
"Non-Final Office Action", U.S. Appl. No. 13/955,723, Dec. 17, 2015, 21 pages.
"Non-Final Office Action", U.S. Appl. No. 14/012,050, Feb. 10, 2015, 18 pages.
"Non-Final Office Action", U.S. Appl. No. 14/031,739, Aug. 18, 2015, 16 pages.
"Non-Final Office Action", U.S. Appl. No. 14/052,903, Mar. 11, 2015, 7 pages.
"Non-Final Office Action", U.S. Appl. No. 14/068,309, Oct. 2, 2015, 14 pages.
"Non-Final Office Action", U.S. Appl. No. 14/150,047, Jun. 29, 2015, 11 pages.
"Non-Final Office Action", U.S. Appl. No. 14/226,041, Jun. 5, 2015, 8 pages.
"Non-Final Office Action", U.S. Appl. No. 14/280,775, Jul. 16, 215, 9 pages.
"Non-Final Office Action", U.S. Appl. No. 14/339,476, Jan. 20, 2016, 9 pages.
"Non-Final Office Action", U.S. Appl. No. 14/445,715, Jan. 15, 2016, 26 pages.
"Non-Final Office Action", U.S. Appl. No. 14/952,738, Jan. 11, 2016, 7 pages.
"Notice of Allowance", U.S. Appl. No. 12/365,166, Apr. 16, 2010, 7 pages.
"Notice of Allowance", U.S. Appl. No. 12/365,166, Aug. 25, 2010, 4 pages.
"Notice of Allowance", U.S. Appl. No. 12/650,699, Jan. 14, 2016, 8 pages.
"Notice of Allowance", U.S. Appl. No. 13/040,090, Mar. 8, 2012, 6 pages.
"Notice of Allowance", U.S. Appl. No. 13/088,237, Jun. 17, 2013, 8 pages.
"Notice of Allowance", U.S. Appl. No. 13/088,237, Jul. 11, 2013, 8 pages.
"Notice of Allowance", U.S. Appl. No. 13/188,419, May 22, 2013, 8 pages.
"Notice of Allowance", U.S. Appl. No. 13/873,557, Dec. 23, 2015, 10 pages.
"Notice of Allowance", U.S. Appl. No. 13/924,838, Mar. 12, 2015, 7 pages.
"Notice of Allowance", U.S. Appl. No. 13/924,838, Jul. 8, 2015, 7 pages.
"Notice of Allowance", U.S. Appl. No. 13/945,968, Sep. 16, 2015, 6 pages.
"Notice of Allowance", U.S. Appl. No. 14/012,050, Dec. 14, 2015, 12 pages.
"Notice of Allowance", U.S. Appl. No. 14/226,041, Dec. 31, 2015, 5 pages.
"Notice of Allowance", U.S. Appl. No. 14/488,709, Sep. 23, 2015, 10 pages.
"On Extensions to Rel-8 PMI Feedback", 3GPP TSG RAN WG1 #60, R1-101129, Motorola, San Francisco, USA,, Feb. 2010, 4 pages.
"On OTDOA in LTE", 3GPP TSG RAN WG1 #55bis, Ljubljana, Slovenia; R1-090353, Jan. 2009, 8 pages.
"On OTDOA method for L TE Positioning", 3GPP TSG RAN WG1 #56, Ericsson, R1090918, Athens, Greece, Feb. 2009, 6 pages.
"On Serving Cell Muting for OTDOA Measurements", 3GPP TSG RANI #57, R1-092628—Los Angeles, CA, USA, Jun. 2009, 7 pages.
"Performance evaluation of adaptive codebook as enhancement of 4 Tx feedback", 3GPP TSG RAN WG1#61bis, R1-103447, Jul. 2010, 6 pages.
"PHY Layer 1 1 4. Specification Impact of Positioning Improvements", 3GPP TSG RAN WG1 #56bis, Athens, Greece; Qualcomm Europe, R1-090852,, Feb. 2009, 3 pages.
"Physical Channels and Modulation (Release 8)", 3GPP TS 36.211 V8.6.0 (Mar. 2009) 3rd Generation Partnership Project; Technical Specification Group Radio Access 28 Network; Evolved Universal Terrestrial Radio Access (E-UTRA);, Mar. 2009, 83 pages.
"Physical Channels and Modulation (Release 9)", 3GPP TS 36.211 V9.0.0 (Dec. 2009); 3rd Generation Partnership Project; Technical Specification Group Radio Access Network; Evolved Universal Terrestrial Radio Access (E-UTRA); Release 9, Dec. 2009, 85 pages.
"Physical layer procedures", 3GPP TS 36.213 V9.0.1 (Dec. 2009); 3rd Generation Partnership Project; Technical Specification Group Radio Access Network; Evolved Universal Terrestrial Radio Access (E-UTRA); Release 9, Dec. 2009, 79 pages.
"Positioning Subframe Muting for OTDOA Measurements", 3GPP TSG RAN1 #58 R1-093406, Shenzhen, P. R. China, Aug. 2009, 9 pages.
"Positioning Support for L TE", 3GPP TSG RAN WG1 #42, Athens, Greece, RP-080995, Dec. 2008, 5 pages.
"Pre-Brief Appeal Conference Decision", U.S. Appl. No. 12/650,699, Apr. 9, 2013, 2 pages.
"Rationale for mandating simulation of 4Tx Widely-Spaced Cross-Polarized Antenna Configuration for LTE-Advanced MU-MIMO", 3GPP TSG-RAN WG1 Meeting #61bis, R1-104184, Dresden, Germany, Jun. 2010, 5 pages.
"Reference Signals for Low Interference Subframes in Downlink;", 3GPP TSG RAN WG1 Meeting #56bis; Seoul, South Korea; Ericsson; R1-091314, Mar. 2009, 8 pages.
"Restriction Requirement", U.S. Appl. No. 14/031,739, Apr. 28, 2015, 7 pages.
"Signalling Support for PRS Muting in", 3GPP TSG RAN2 #70, Montreal, Canada; Ericsson, ST-Ericsson; R2-103102, May 2010, 2 pages.
"Some Results on DL-MIMO Enhancements for LTE-A", 3GPP TSG WG1 #55bis, R1-090328, Motorola; Ljubjana, Slovenia, Jan. 2009, 5 pages.
"Sounding RS Control Signaling for Closed Loop Antenna Selection", 3GPP TSG RAN #51, R1-080017—Mitsubishi Electric, Jan. 2008, 8 pages.
"Study on hearability of reference signals in LTE positioning support", 3GPP TSG RAN1 #56bisa—R1-091336, Seoul, South Korea, Mar. 2009, 8 pages.
"Supplemental Notice of Allowance", U.S. Appl. No. 14/488,709, Oct. 7, 2015, 8 pages.
"System Simulation Results for OTDOA", 3GPP TSG RAN WG4 #53, Jeju, South Korea, Ericsson, R4-094532;, Nov. 2009, 3 pages.
"Technical 1 34. Specification Group Radio Access Network; Evolved Universal Terrestrial Radio Access (E-UTRA);", 3GPP TS 36.211 v8.4.0 (Sep. 2008); 3rd Generation Partnership Project; Physical Channels and Modulation (Release 8), 2008, 78 pages.
"Technical Specification Group Radio Access Network", 3GPP TS 25.305 V8.1.0 (Dec. 2008) 3rd Generation Partnership Project; Stage 2 functional specification of User Equipment (UE) positioning in UTRAN (Release 8), 2008, 79 pages.

(56) References Cited

OTHER PUBLICATIONS

"Technical Specification Group Radio Access Network; Evolved Universal Terrestrial Radio Access (E-UTRA)", 3GPP TS 36.305 V0.2.0 (May 2009) 3rd generation Partnership Project; Stage 2 functional specification of User Equipment, (UE) positioning in E-UTRAN (Release 9);, 2010, 52 pages.
"Text 1 3 0. proposal on Orthonogonal PRS transmissions in mixed CP deployments using MBSFN subframes", 3GPP TSG RAN WG1 #59, Jeju, South Korea, Motorola, R1-095003;, Nov. 2009, 4 pages.
"Text proposal on measurements", 3GPP TSG RAN2 #60bis, Tdoc R2-080420; Motorola, Sevilla, Spain, Jan. 2008, 9 pages.
"Two Component Feedback Design and Codebooks", 3GPP TSG RAN1 #61, R1-103328, Motorola, Montreal, Canada, May 2010, 7 pages.
"Two-Level Codebook design for MU MIMO enhancement", 3GPP TSG RAN WG1 #60, R1-102904, Montreal, Canada, May 2010, 8 pages.
"UTRAN SFN-SFN observed lime 11 difference measurement & 3GPP TS 25.311 IE 10.3.7.106 "UE positioning OTDOA neighbor cell info' assistance data D fields"", 3GPP TSG RAN WG4 (Radio) #20, New Jersey, USA; TDOC R4-011408,, Nov. 2001, 4 pages.
"View on the feedback framework for Rei. 1 0", 3GPP TSG RAN WG1 #61, R1-103026, Samsung, Montreal, Canada, May 2010, 15 pages.
"Views on Codebook Design for Downlink 8Tx MIMO", 3GPP TSG RAN WG1 #60. R1-101219, San Francisco, USA, Feb. 2010, 9 pages.
Colin,"Restrictions on Autonomous Muting to Enable 1 58. Time Difference of Arrival Measurements", U.S. Appl. No. 61/295,678, filed Jan. 15, 2010, 26 pages.
Costas,"A Study of a Class of Detection Waveforms Having Nearly Ideal Range-Doppler Ambiguity Properties", Fellow, IEEE; Proceedings of the IEEE, vol. 72, No. 8, Aug. 1984, 14 pages.
Guo,"A Series-Shunt Symmetric Switch Makes Transmit-Receive Antennas Reconfigurable in Multipath Channels", IEEE 3d Int'l Conf. on Digital Object Identifier, May 29, 2011, pp. 468-471.
Jafar,"On Optimality of Beamforming for Multiple Antenna Systems with Imperfect Feedback", Department of Electrical Engineering, Stanford University, CA, USA, 2004, 7 pages.
Knoppert,"Communication Device", U.S. Appl. No. 29/329,028, filed Dec. 8, 2008, 10 pages.
Knoppert,"Indicator Shelf for Portable Electronic Device", U.S. Appl. No. 12/480,289, filed Jun. 8, 2009, 15 pages.
Krishnamurthy,"Interference Control, SINR Optimization and Signaling Enhancements to Improve the Performance of OTDOA Measurements", U.S. Appl. No. 12/813,221, filed Jun. 10, 2010, 20 pages.
Krishnamurthy,"Threshold Determination in TDOA-Based Positioning System", U.S. Appl. No. 12/712,191, filed Feb. 24, 2010, 19 pages.
Li,"A Subband Feedback Controlled Generalized Sidelobe Canceller in Frequency Domain with Multi-Channel Postfilter", 2nd International Workshop on Intelligent Systems and Applications (ISA), IEEE, May 22, 2010, 4 pages.
MACCM"GaAs SP6T 2.5V High Power Switch Dual-/Tri-/Quad-Band GSM Applications", Rev. V1 data sheet, www.macomtech.com, Mar. 22, 2003, 5 pages.
Renesas,"uPG2417T6M GaAs Integrated Circuit SP6T Switch for NFC Application (R09DS0010EJ0100)", Rev. 1.00 data sheet, Dec. 24, 2010, 12 pages.
Sayana,"Method of Codebook Design and Precoder Feedback in Wireless Communication Systems", U.S. Appl. No. 61/374,241, filed Aug. 16, 2010, 40 pages.
Sayana,"Method of Precoder Information Feedback in Multi-Antenna Wireless Communication Systems", U.S. Appl. No. 61/331,818, filed May 5, 2010, 43 pages.
Tesoriero,"Improving Location Awareness in Indoor Spaces Using RFID Technology", ScienceDirect, Expert Systems with Applications, 2010, 894-898.
Valkonen,"Impedance Matching and Tuning of Non-Resonant Mobile Terminal Antennas", Aalto University Doctoral Dissertations, Mar. 15, 2013, 94 pages.
Visotsky,"Space—Time Transmit Precoding With Imperfect Feedback", IEEE Transactions on Information Theory, vol. 47, No. 6, Sep. 2001, pp. 2632-2639.
Vodafone"PDCCH Structure for MTC Enhanced Coverage", 3GPP TSG RAN WG1 #76, R1-141030, Prague, Czech Republic, Feb. 2014, 2 pages.
Zhuang,"Method for Precoding Based on Antenna Grouping", U.S. Appl. No. 12/899,211, filed Oct. 6, 2010, 26 pages.
"Coverage enhancement for RACH messages", 3GPP TSG-RAN WG1 Meeting #76, R1-140153, Alcatel-Lucent, Alcatel-Lucent Shanghai Bell, Feb. 2014, 5 pages.
"Coverage Improvement for PRACH", 3GPP TSG RAN WG1 Meeting #76—R1-140115, Intel Corporation, Feb. 2014, 9 pages.
"Final Office Action", U.S. Appl. No. 14/150,047, Mar. 4, 2016, 14 pages.
"International Search Report and Written Opinion", Application No. PCT/US2015/033570, Oct. 19, 2015, 18 pages.
"Non-Final Office Action", U.S. Appl. No. 13/733,297, Feb. 2, 2016, 17 pages.
"Non-Final Office Action", U.S. Appl. No. 14/280,775, Mar. 23, 2016, 11 pages.
"Non-Final Office Action", U.S. Appl. No. 14/330,317, Feb. 25, 2016, 14 pages.
"Notice of Allowance", U.S. Appl. No. 13/873,557, Apr. 11, 2016, 5 pages.
"Notice of Allowance", U.S. Appl. No. 14/031,739, Mar. 1, 2016, 7 pages.
"Notice of Allowance", U.S. Appl. No. 14/052,903, Feb. 1, 2016, 8 pages.
"Notice of Allowance", U.S. Appl. No. 14/952,738, Mar. 28, 2016, 7 pages.
"On the need of PDCCH for SIB, RAR and Paging", 3GPP TSG-RAN WG1 #76—R1140239, Feb. 2014, 4 pages.
"Specification Impact of Enhanced Filtering for Scalable UMTS", 3GPP TSG RAN WG1 Meeting #76, R1-140726, Qualcomm Incorporated, Feb. 2014, 2 pages.
"Supplemental Notice of Allowance", U.S. Appl. No. 14/031,739, Apr. 21, 2016, 2 pages.
"Written Opinion", Application No. PCT/US2013/071616, Jun. 3, 2015, 9 pages.
Yu-chun,"A New Downlink Control Channel Scheme for LTE", Vehicular Technology Conference (VTC Spring), 2013 IEEE 77th, Jun. 2, 2013, 6 pages.
"Corrected Notice of Allowance", U.S. Appl. No. 14/031,739, Jun. 8, 2016, 2 pages.
"Final Office Action", U.S. Appl. No. 13/692,520, May 26, 2016, 25 pages.
"Final Office Action", U.S. Appl. No. 13/733,297, Jul. 18, 2016, 17 pages.
"Final Office Action", U.S. Appl. No. 13/955,723, Jun. 16, 2016, 31 pages.
"Final Office Action", U.S. Appl. No. 14/330,317, Jun. 16, 2016, 15 pages.
"Final Office Action", U.S. Appl. No. 14/445,715, Jul. 8, 2016, 31 pages.
"Foreign Office Action", CN Application No. 201480013330.2, Jun. 2, 2016, 15 pages.
"Notice of Allowance", U.S. Appl. No. 14/280,755, Jul. 15, 2016, 5 pages.
"Notice of Allowance", U.S. Appl. No. 14/339,476, Jul. 18, 2016, 11 pages.
"Supplemental Notice of Allowance", U.S. Appl. No. 14/952,738, Jun. 9, 2016, 4 pages.
"Advisory Action", U.S. Appl. No. 13/692,520, Sep. 6, 2016, 3 pages.
"Corrected Notice of Allowance", U.S. Appl. No. 14/339,476, Sep. 13, 2016, 2 pages.
"Corrected Notice of Allowance", U.S. Appl. No. 14/339,476, Sep. 30, 2016, 2 pages.

(56) References Cited

OTHER PUBLICATIONS

"Non-Final Office Action", U.S. Appl. No. 13/692,520, Nov. 17, 2016, 7 pages.
"Non-Final Office Action", U.S. Appl. No. 14/445,715, Oct. 20, 2016, 43 pages.
"Notice of Allowance", U.S. Appl. No. 14/150,047, Oct. 28, 2016, 8 pages.
"Corrected Notice of Allowance", U.S. Appl. No. 14/150,047, Dec. 16, 2016, 2 pages.
"Non-Final Office Action", U.S. Appl. No. 13/955,723, Jan. 23, 2017, 23 pages.
"Non-Final Office Action", U.S. Appl. No. 13/955,723, Jan. 13, 2017, 30 pages.

* cited by examiner

METHODS AND APPARATUS FOR TRANSMITTING DATA BETWEEN DIFFERENT PEER-TO-PEER COMMUNICATION GROUPS

The present disclosure relates in general to wireless communication devices, and, in particular, to methods and apparatus for transmitting data between different peer-to-peer communication groups.

BACKGROUND OF THE INVENTION

Most modern wireless devices include some form of peer-to-peer wireless communication. For example, a cellular phone may exchange contact information with another cellular phone via a Bluetooth connection or execute a multiplayer game with another cellular phone via a peer-to-peer Wi-Fi connection (e.g., an 802.11 Wi-Fi connection without the need for a router).

However, these peer-to-peer mechanisms do not scale efficiently to a large number of devices. Attempts to scale these peer-to-peer mechanisms results in inefficient routing of data packets, which results in data delays and increased power consumption.

DETAILED DESCRIPTION OF THE PREFERRED EMBODIMENTS

Figure 1:
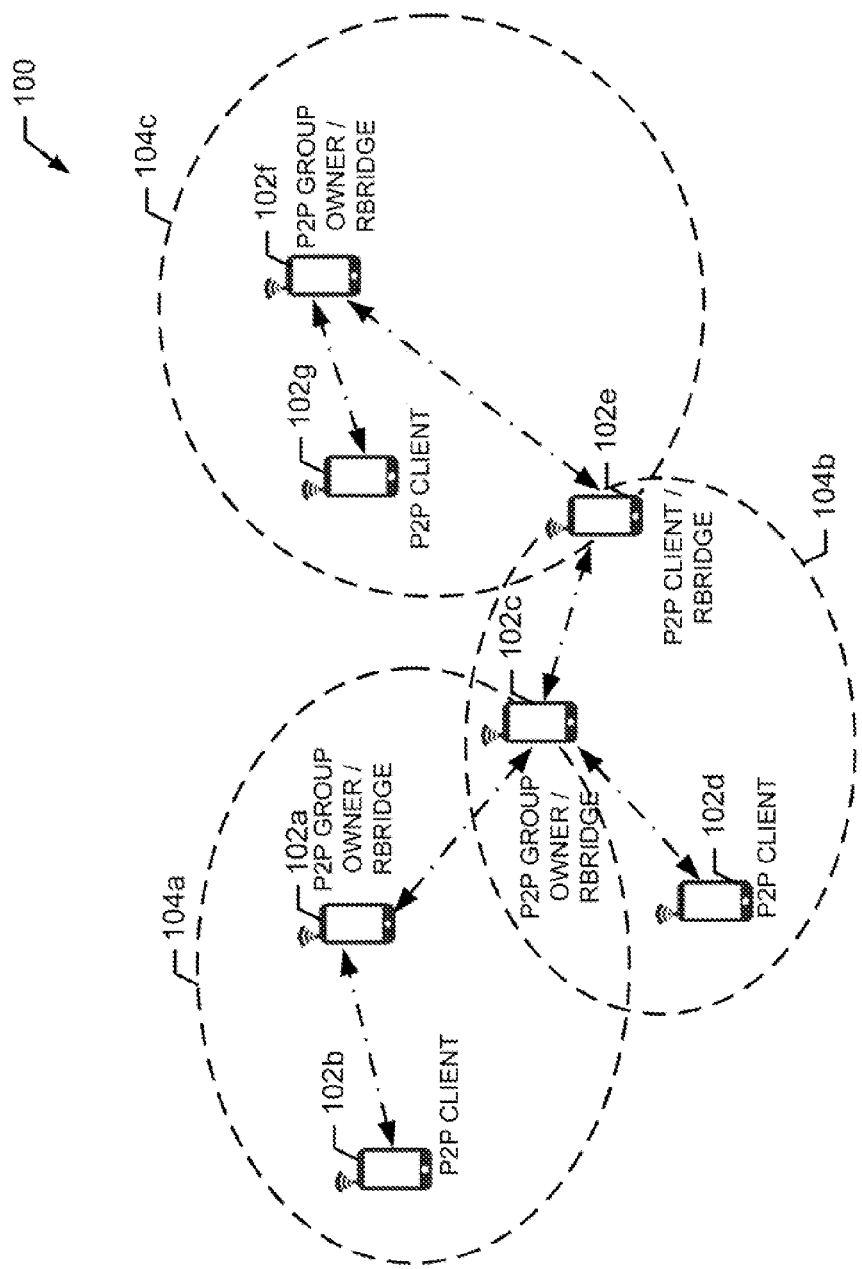
FIG. 1 is a block diagram of an example peer-to-peer (P2P) neighborhood.

Briefly, in a specific embodiment, a cellular phone or other computing device determines if it is simultaneously connected via Wi-Fi to two different peer-to-peer (P2P) Wi-Fi group owners. If so, the cellular phone instantiates a TRILL RBridge interface in the phone to facilitate communications between each, otherwise separate, peer-to-peer Wi-Fi group. The cellular phone also determines if it is simultaneously connected to at least one other peer-to-peer Wi-Fi device (e.g. another cellular phone) and a Wi-Fi router. In such an instance, the cellular phone determines if the Wi-Fi router also includes a TRILL RBridge interface. If the Wi-Fi router does not include a TRILL RBridge interface, the cellular phone instantiates/runs its local TRILL RBridge interface for communications between the other peer-to-peer Wi-Fi device and the Wi-Fi router. If the Wi-Fi router does include a TRILL RBridge interface, the cellular phone causes the TRILL RBridge interface at the Wi-Fi router to be instantiated for communications between the other peer-to-peer Wi-Fi device and the Wi-Fi router. Among other features, wireless devices are able to discover each other and dynamically form very large peer-to-peer groups in manner that consumes very little power and scales efficiently.

More generally, methods and apparatus for transmitting data between different peer-to-peer communication groups are disclosed. In an embodiment, a wireless device determines if it is simultaneously connected to a plurality of peer-to-peer communication groups and instantiates a bridge interface at the wireless device for communications between each peer-to-peer communication group. The wireless device also determines if it is simultaneously connected to at least one peer-to-peer communication device and an access point. In such an instance, the wireless device determines if the access point also includes a bridge interface. If the access point does not include a bridge interface, the wireless device instantiates/runs the bridge interface at the wireless device for communications between the at least one peer-to-peer communication device and the access point. If the access point does include a bridge interface, the wireless device causes the bridge interface at the access point to be instantiated for communications between the at least one peer-to-peer communication device and the access point.

In an embodiment, a radio frequency transceiver is operatively coupled to a controller (e.g., an 802.11 transceiver controlled by a microprocessor). The controller is structured to connect to a first peer-to-peer communication group via a first peer-to-peer group owner (e.g., connect to a first Wi-Fi peer-to-peer communication group via another wireless device acting as group owner). The controller is also structured to connect to a second different peer-to-peer communication group via a second peer-to-peer group owner (e.g., connect to a second Wi-Fi peer-to-peer communication group via yet another wireless device acting as another group owner). The controller is also structured to dynamically determine to instantiate a bridge interface to transmit data between the first peer-to-peer communication group and the second peer-to-peer communication group (e.g., run a TRILL RBrdige to connect the two separate peer-to-peer groups in to a peer-to-peer "neighborhood"). The controller is also structured to filter peer-to-peer traffic between the first peer-to-peer communication group and the second peer-to-peer communication group based on a class of traffic (e.g., limit peer-to-peer traffic to this peer-to-peer neighborhood).

In one example, a plurality of devices in the first peer-to-peer communication group and a second different plurality of devices in the second peer-to-peer communication group are each members of the same Internet Protocol (IP) subnet. In one example, the controller is structured to connect to the first peer-to-peer communication group by connecting to a Wi-Fi peer-to-peer communication group owner. In one example, the controller is structured to instantiate the bridge interface by instantiating a Transparent Interconnection of Lots of Links (TRILL) Routing Bridge (RBridge) interface.

Turning now to the figures, a block diagram of certain elements of an example peer-to-peer (P2P) neighborhood system 100 is illustrated in FIG. 1. The illustrated system 100 includes a plurality of wireless devices 102 (e.g., cellular phone, portable computer, television, camera, etc.) in a plurality of peer-to-peer (P2P) groups 104. Each peer-to-peer group 104 typically includes one wireless device 102a, 102c, and 102f that acts as the peer-to-peer group owner 102a, 102c, and 102f and one or more other wireless devices 102 that are peer-to-peer (P2P) clients. Each peer-to-peer group owner 102a, 102c, and 102f operates like an access point (e.g., 802.11 Wi-Fi router) for clients in that peer-to-peer group 104, even though in this example, each peer-to-peer group owner 102a, 102c, and 102f does not have a direct connection to a network infrastructure.

A peer-to-peer group 104 may be wirelessly connected to one or more other peer-to-peer groups 104 via one or more of the wireless devices 102. In such an instance, a wireless device 102 connecting peer-to-peer groups 104 operates a bridge. For example, the connecting wireless device 102 may operate an RBridge. Wireless devices 102 operating a bridge may be peer-to-peer group owners and/or clients.

The example shown in FIG. 1 includes three peer-to-peer groups 104a, 104b, and 104c. The peer-to-peer group 104a includes a peer-to-peer group owner 102a and two peer-to-peer clients 102b and 102c. The peer-to-peer group 104b includes a peer-to-peer group owner 102c and two peer-to-peer clients 102d and 102e. Wireless device 102c is a client of the group 104a and an owner of the group 104b. The peer-to-peer group 104c includes a peer-to-peer group owner 102f and two peer-to-peer clients 102g and 102e. Wireless device 102e is a client in of the group 104b and a client of the group 104c.

The group owner 102a runs an RBridge, which forms one side of a connection between group 104a and group 104b. The group owner 102c runs another RBridge, which forms the other side of the connection between group 104a and group 104b. The client 102e runs an RBridge, which forms one side of a connection between group 104b and group 104c. The group owner 102f runs another RBridge, which forms the other side of the connection between group 104b and group 104c.

Collectively, these peer-to-peer groups 104, directly and/or indirectly connected by bridges 102a, 102c, 102e, and 102f, form a network "neighborhood." Any wireless device 102 in the neighborhood may communicate with any other wireless device 102 in the neighborhood. For example, wireless device 102b may send a message to wireless device 102g. In this example, the message travels from wireless device 102b to wireless device 102a. Wireless device 102a, acting as a group owner and a bridge, determines that the destination for the message is not in group 104a. Accordingly, wireless device 102a forwards the message to wireless device 102c. Wireless device 102c, acting as a group owner and a bridge, determines that the destination for the message is not in group 104b. Accordingly, wireless device 102c forwards the message to wireless device 102e. Wireless device 102e is not a group owner. Accordingly, wireless device 102e forwards the message to wireless device 102f. Wireless device 102f, acting as a group owner and a bridge, determines that the destination for the message is in group 104c. Accordingly, wireless device 102f forwards the message to its final destination, wireless device 102g.

Figure 2:
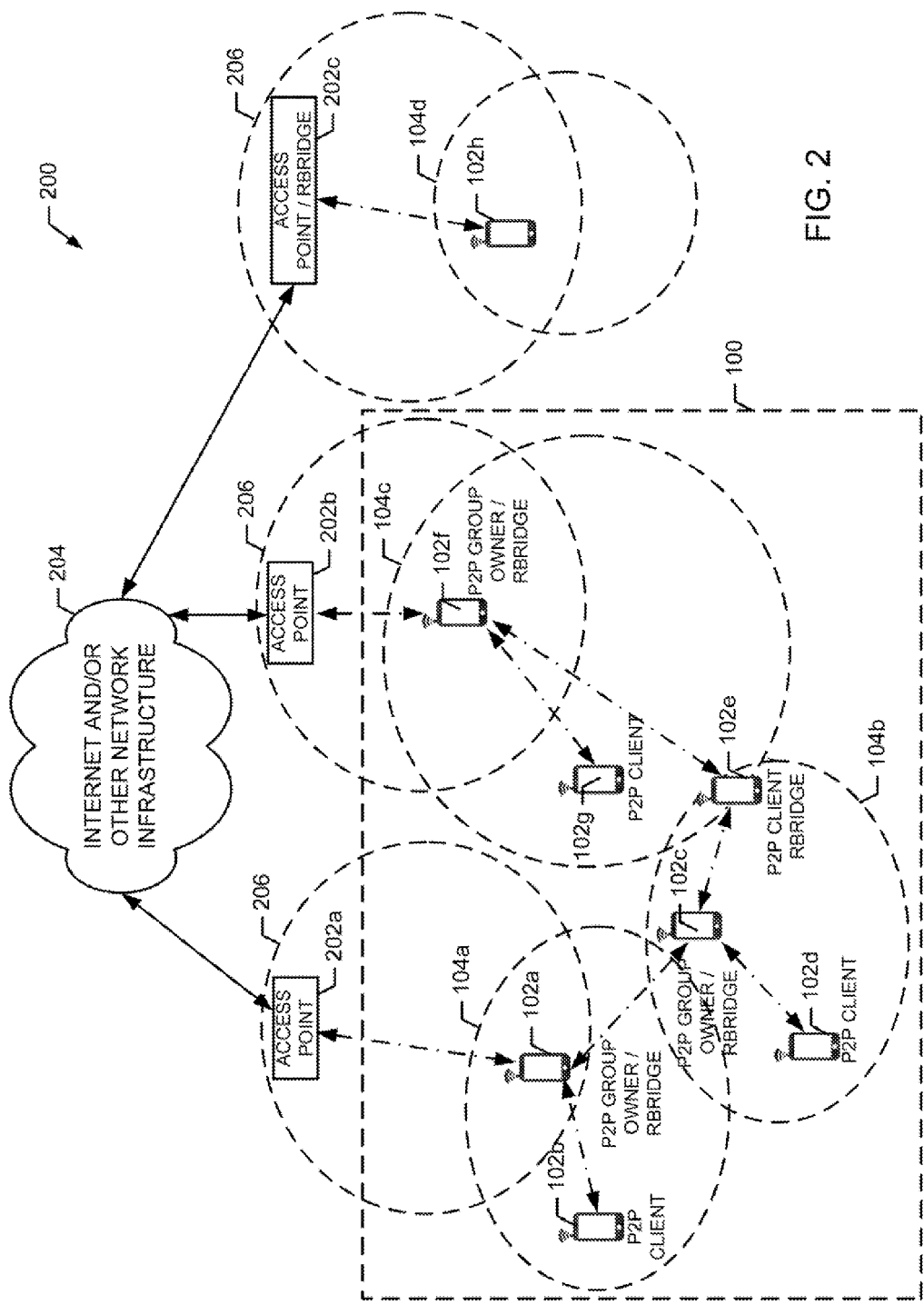
FIG. 2 is a block diagram of another example peer-to-peer (P2P) neighborhood.

A block diagram of certain elements of another example peer-to-peer (P2P) neighborhood system 100 is illustrated in FIG. 2. The example system 200, like the example system 100 (which is included as a subset of example system 200), includes a plurality of wireless devices 102 (e.g., cellular phone, portable computer, television, camera, etc.) in a plurality of peer-to-peer (P2P) groups 104. Again, each peer-to-peer group 104 typically includes one wireless device 102a, 102c, and 102f that acts as the peer-to-peer group owner 102a, 102c, and 102f and one or more other wireless devices 102 that are peer-to-peer (P2P) clients. Each peer-to-peer group owner 102a, 102c, and 102f operates like an access point (e.g., 802.11 Wi-Fi router) for clients in that peer-to-peer group 104.

In addition, in this example, each peer-to-peer group owner 102a, 102c, and 102f has a wireless connection to an access point 202, which in turn has a direct connection to a network infrastructure 204. The network infrastructure 204 may be any suitable network infrastructure 204 such as the Internet and/or some other wired and/or wireless data network, including, but not limited to, any suitable wide area network or local area network.

As described above with reference to FIG. 1, each peer-to-peer group 104 may be wirelessly connected to one or more other peer-to-peer groups 104 via one or more of the wireless devices 102. In such an instance, a wireless device 102 connecting peer-to-peer groups 104 operates a bridge. For example, the connecting wireless device 102 may operate an RBridge. Wireless devices 102 operating a bridge may be peer-to-peer group owners and/or clients.

In addition, each peer-to-peer group 104 may be connected to one or more other peer-to-peer groups 104 via an access point 202 and the network infrastructure 204. In such an instance, a wireless device 102 connecting the group 104 to the access point 202 may operate the bridge or the access point 202 may operate the bridge. For example, the wireless device 102 and/or the access point 202 may operate an RBridge.

Collectively, these peer-to-peer groups 104, directly and/or indirectly connected by wireless devices 102, access points 202, and/or the network infrastructure 204, form a network "neighborhood." Any wireless device 102 in the neighborhood may communicate with any other wireless device 102 in the neighborhood. For example, wireless device 102b may send a message to wireless device 102h. In this example, the message travels from wireless device 102b to wireless device 102a. Wireless device 102a, acting as a group owner and a bridge, determines that the destination for the message is not in group 104a. Accordingly, wireless device 102a forwards the message to access point 202a. Access point 202a forwards the message to access point 202c via the network infrastructure 204. Access point 202c, acting as a bridge, determines that the destination for the message is in group 104d. Accordingly, access point 202c forwards the message to its final destination, wireless device 102h.

Figure 3:
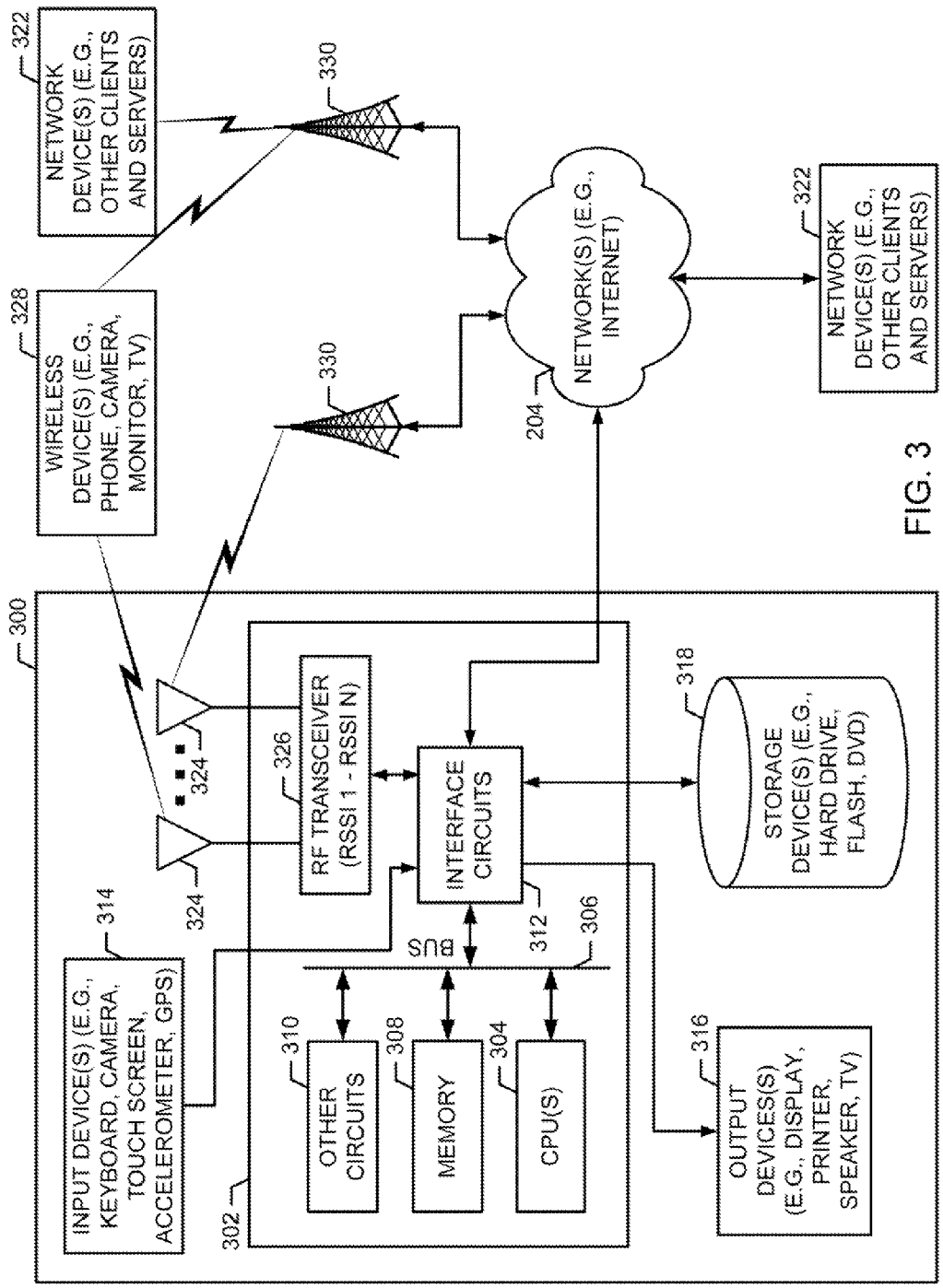
FIG. 3 is a block diagram of an example electronic device.

Each of the devices illustrated in FIG. 1 and FIG. 2 (e.g., wireless device 102 and/or access point 204) may include certain common aspects of many electronic devices such as microprocessors, memories, peripherals, etc. A block diagram of certain elements of an example electronic device 300 is illustrated in FIG. 3. The example electrical device 300 includes a main unit 302 which may include, if desired, one or more physical processors 304 electrically coupled by an address/data bus 306 to one or more memories 308, other computer circuitry 310, and one or more interface circuits 312. The processor 304 may be any suitable processor or plurality of processors. For example, the electrical device 300 may include a central processing unit (CPU) and/or a graphics processing unit (GPU). In some embodiments, the physical processor(s) 304 are managed by a hypervisor executing a plurality of virtual processors and/or virtual machines.

The memory 308 may include various types of non-transitory memory including volatile memory and/or nonvolatile memory such as, but not limited to, distributed memory, read-only memory (ROM), random access memory (RAM) etc. The memory 308 typically stores a software program that interacts with the other devices in the system as described herein. This program may be executed by the processor 304 in any suitable manner. The memory 308 may also store digital data indicative of documents, files, programs, web pages, etc. retrieved from a server and/or loaded via an input device 314.

The interface circuit 312 may be implemented using any suitable interface standard, such as an Ethernet interface and/or a Universal Serial Bus (USB) interface. One or more input devices 314 may be connected to the interface circuit 312 for entering data and commands into the main unit 302. For example, the input device 314 may be a keyboard, mouse, touch screen, track pad, isopoint, camera, voice recognition system, accelerometer, global positioning system (GPS), and/or any other suitable input device.

One or more displays, printers, speakers, monitors, televisions, high definition televisions, and/or other suitable output devices 316 may also be connected to the main unit 302 via the interface circuit 312. The display 316 may be a cathode ray tube (CRTs), liquid crystal displays (LCDs), electronic ink (e-ink), and/or any other suitable type of display. The display 316 generates visual displays of data generated during operation of the device 300. For example, the display 316 may be used to display web pages and/or other content received from a server 106 and other device. The visual displays may include prompts for human input, run time statistics, calculated values, data, etc.

One or more storage devices 318 may also be connected to the main unit 302 via the interface circuit 312. For example, a hard drive, CD drive, DVD drive, and/or other storage devices may be connected to the main unit 302. The storage devices 318 may store any type of data used by the device 300.

The electrical device 300 may also exchange data with other network devices 322 via a connection to a network 110. The network connection may be any type of network connection, such as an Ethernet connection, digital subscriber line (DSL), telephone line, coaxial cable, wireless base station 330, etc. Users 114 of the system 100 may be required to register with a server 106. In such an instance, each user 114 may choose a user identifier (e.g., e-mail address) and a password which may be required for the activation of services. The user identifier and password may be passed across the network 110 using encryption built into the user's browser. Alternatively, the user identifier and/or password may be assigned by the server 106.

In some embodiments, the device 300 may be a wireless device 300. In such an instance, the device 300 may include one or more antennas 324 connected to one or more radio frequency (RF) transceivers 326. The transceiver 326 may include one or more receivers and one or more transmitters operating on the same and/or different frequencies. For example, the device 300 may include a blue tooth transceiver 316, a Wi-Fi transceiver 316, and diversity cellular transceivers 316. The transceiver 326 allows the device 300 to exchange signals, such as voice, video and data, with other wireless devices 328, such as a phone, camera, monitor, television, and/or high definition television. For example, the device 300 may send and receive wireless telephone signals, text messages, audio signals and/or video signals directly and/or via a base station 330. A receive signal strength indicator (RSSI) associated with each receiver generates an indication of the relative strength or weakness of each signal being received by the device 300.

Figure 4:
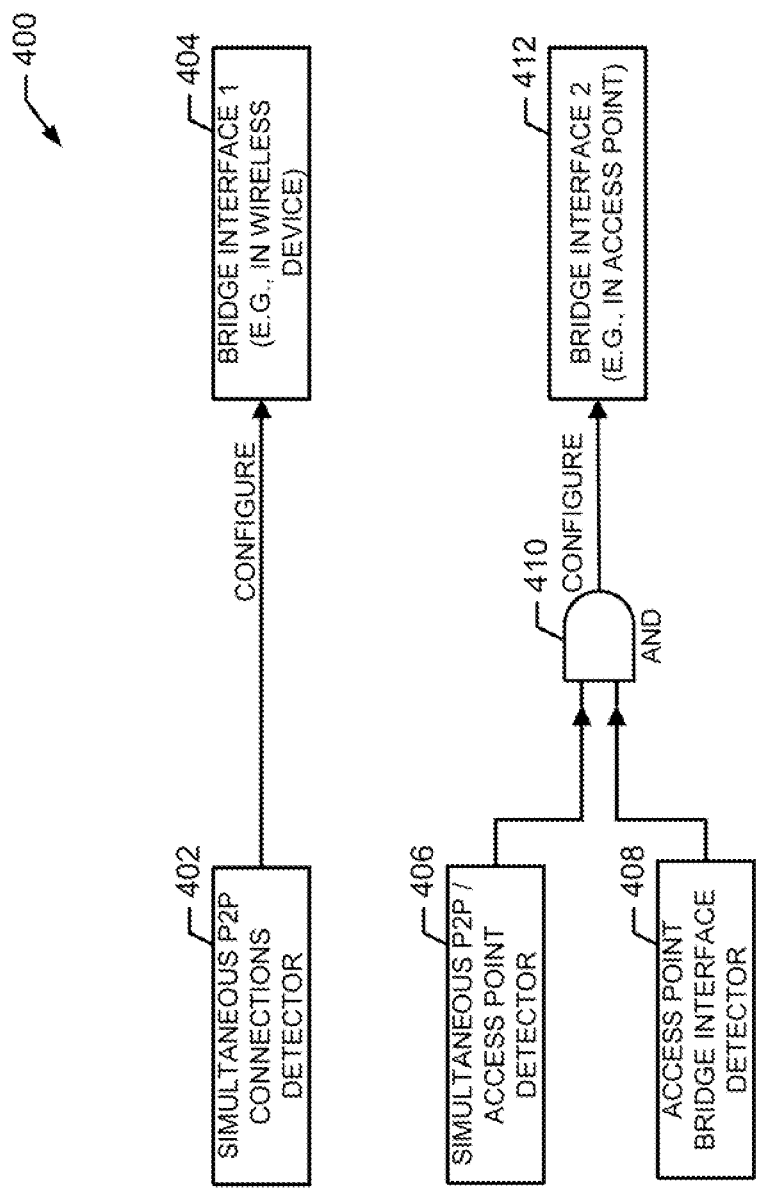
FIG. 4 is a block diagram of an example electronic device for determining if a device will run a bridge.

A block diagram of certain elements of an example electronic device 400 for determining if a device will run a bridge is illustrated in FIG. 4. The electronic device 400 may be implemented in hardware or a combination of hardware and hardware executing software. In one embodiment, the electronic device 400 includes a CPU executing software. Other suitable hardware includes one or more application specific integrated circuits (ASICs), state machines, field programmable gate arrays (FPGAs), and/or digital signal processors (DSPs).

The example electronic device 400 includes simultaneous P2P connections detector 402 operatively coupled to a first bridge interface 404. In an example, the first bridge interface 404 is in a wireless device 102. If the simultaneous P2P connections detector 402 determines that the electronic device 400 is connected to two or more P2P connections at the same time, the simultaneous P2P connections detector 402 causes the electronic device 400 to instantiate the first bridge interface 404. For example, if a wireless device 102, such as a cellular phone, determines that it is associated with two different other wireless devices 102 that are both acting as P2P group owners, the wireless device 102 runs an RBridge.

The example electronic device 400 also includes a simultaneous P2P/access point detector 406 and an access point bridge interface detector 408. The simultaneous P2P/access point detector 406 and the access point bridge interface detector 408 are operatively coupled to an AND gate 410. The AND gate 410 is operatively coupled to a second bridge interface 412. In an example, the second bridge interface 404 is in an access point 202.

If the simultaneous P2P/access point detector 406 indicates that the electronic device 400 is connected to a P2P connection and an access point 202 at the same time, and the access point bridge interface detector 408 indicates that the access point 202 includes a bridge interface, then the electronic device 400 causes the second bridge interface 404 to be instantiated. For example, if the wireless device 102, determines that it is associated with another wireless device 102 that is acting as a P2P group owner, and at the same time the wireless device 102 is associated with an access point 202 that is capable of running an RBridge interface, the wireless device 102 causes the access point 202 to run the RBridge interface.

If the simultaneous P2P/access point detector 406 does not indicate that the electronic device 400 is connected to a P2P connection and an access point 202 at the same time, or the access point bridge interface detector 408 does not indicate that the access point 202 includes a bridge interface, then the electronic device 400 does not cause the second bridge interface 404 to be instantiated. For example, if the wireless device 102, determines that it is not associated with another wireless device 102 that is acting as a P2P group owner, or the wireless device 102 determines that it is not associated with an access point 202 that is capable of running an RBridge interface, the wireless device 102 does not attempt to cause the access point 202 to run an RBridge interface.

Figure 5:
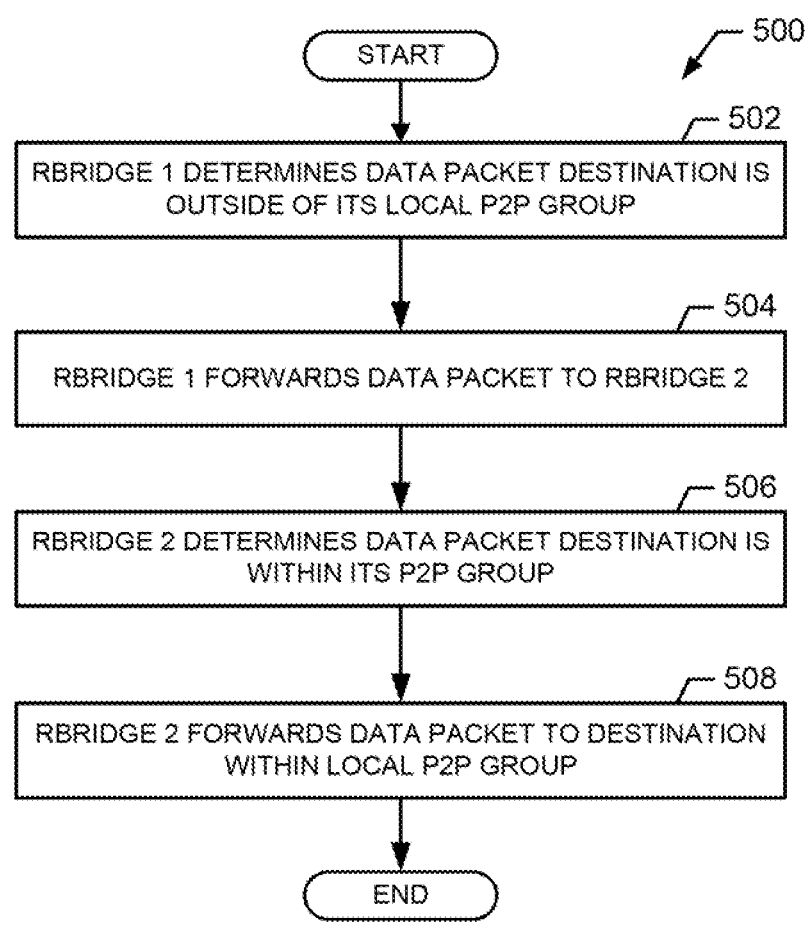
FIG. 5 is a flowchart of an example process for transmitting data between different peer-to-peer communication groups.

A flowchart of an example process 500 for transmitting data between different peer-to-peer communication groups is illustrated in FIG. 5. The process 500 may be carried out by one or more suitably programmed processors such as a CPU executing software (e.g., block 304 of FIG. 3). The process 500 may also be carried out by hardware or a combination of hardware and hardware executing software. Suitable hardware may include one or more application specific integrated circuits (ASICs), state machines, field programmable gate arrays (FPGAs), digital signal processors (DSPs), and/or other suitable hardware. Although the process 500 is described with reference to the flowchart illustrated in FIG. 5, it will be appreciated that many other methods of performing the acts associated with process 500 may be used. For example, the order of many of the operations may be changed, and some of the operations described may be optional.

In general, data packets are transmitted between different peer-to-peer communication groups using RBridges. More specifically, the process 500 begins when a first RBridge determines that a data packet destination is outside of its local P2P group 104 (block 502). For example, in FIG. 2, P2P group owner and RBridge 102*a* determines that a data packet destination is outside of its local P2P group 104*a*. In response, the first RBridge forwards the data packet to a second RBridge (block 504). For example, RBridge 102*a* forwards the data packet to access point and RBridge 202*c* via access point 202*a* and network 204.

When the second RBridge receives the data packet, the second RBridge determines that the data packet destination is inside of its local P2P group 104 (block 506). For example, RBridge 202*c* determines that the data packet destination is inside of its local P2P group 104*d*. Accordingly, the second RBridge forwards the data packet to its destination within the local P2P group 104. For example, RBridge 202*c* forwards the data packet to wireless device 102*h*.

Figure 6:
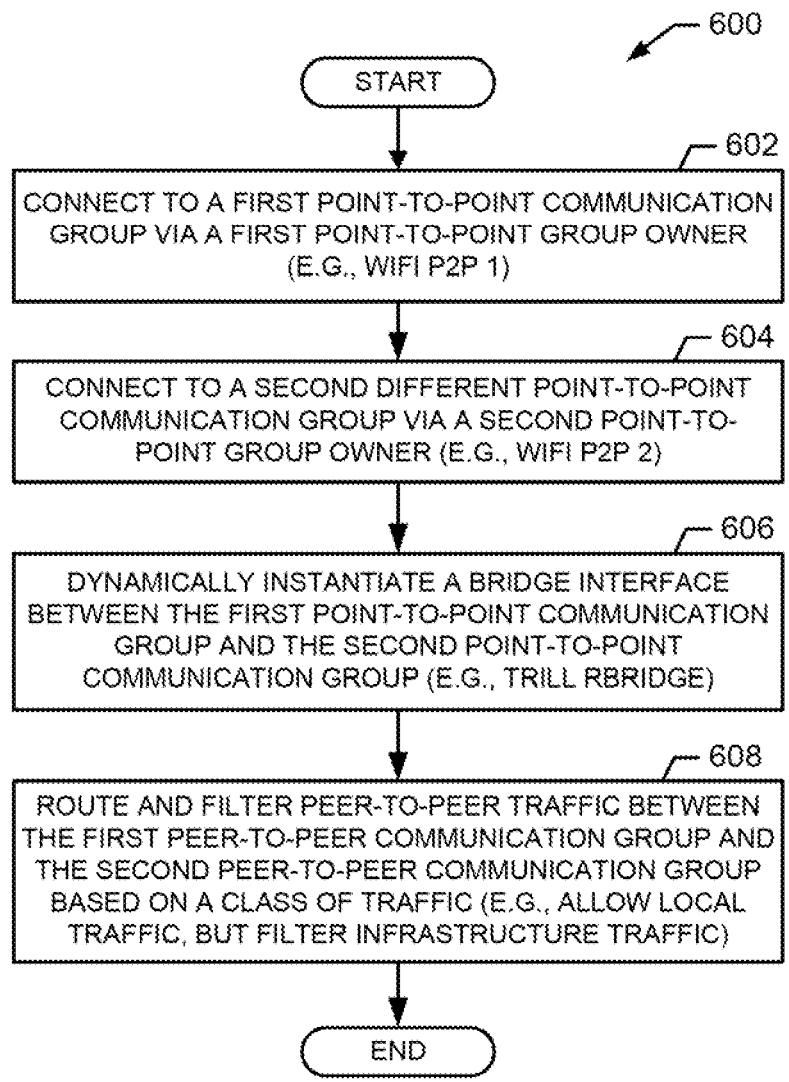
FIG. 6 is a flowchart of another example process for transmitting data between different peer-to-peer communication groups.

A flowchart of another example process 600 for transmitting data between different peer-to-peer communication groups is illustrated in FIG. 6. The process 600 may be carried out by one or more suitably programmed processors such as a CPU executing software (e.g., block 304 of FIG. 3). The process 600 may also be carried out by hardware or a combination of hardware and hardware executing software. Suitable hardware may include one or more application specific integrated circuits (ASICs), state machines, field programmable gate arrays (FPGAs), digital signal processors (DSPs), and/or other suitable hardware. Although the process 600 is described with reference to the flowchart illustrated in FIG. 6 it will be appreciated that many other methods of performing the acts associated with process 600 may be used. For example, the order of many of the operations may be changed, and some of the operations described may be optional.

In general, a wireless device 102 connects to two different peer-to-peer communication groups 104 via two different peer-to-peer group owners 102/202. The wireless device 102 then instantiates a bridge interface between the two communication groups 104 and uses the bridge interface to route and filter peer-to-peer traffic between the two communication groups based on a class of traffic.

More specifically, the process 600 begins when a wireless device 102 connects to a first peer-to-peer communication group 104 via a first peer-to-peer group owner 102/202 (block 602). For example, in FIG. 2, wireless device 102*e* connects to peer-to-peer communication group 104*b* via peer-to-peer group owner 102*c*. The wireless device 102 also connects to a second peer-to-peer communication group 104 via a second peer-to-peer group owner 102/202 (block 604). For example, wireless device 102*e* also connects to peer-to-peer communication group 104*c* via peer-to-peer group owner 102*f*.

Once the wireless device 102 is connected to two or more different peer-to-peer communication groups 104, the wireless device 102 instantiates a bridge interface between the first peer-to-peer communication group 104 and the second peer-to-peer communication group 104 (block 606). For example, the wireless device 102*e* instantiates a TRILL RBridge interface between peer-to-peer communication group 104*b* and peer-to-peer communication group 104*c*. The wireless device 102 then uses the bridge interface to route and filter peer-to-peer traffic between the first peer-to-peer communication group and the second peer-to-peer communication group based on a class of traffic (block 608). For example, the wireless device 102*e*, running the RBridge between group 104*b* and group 104*c*, may allow local traffic to be routed, but filter network infrastructure traffic.

Figure 7:
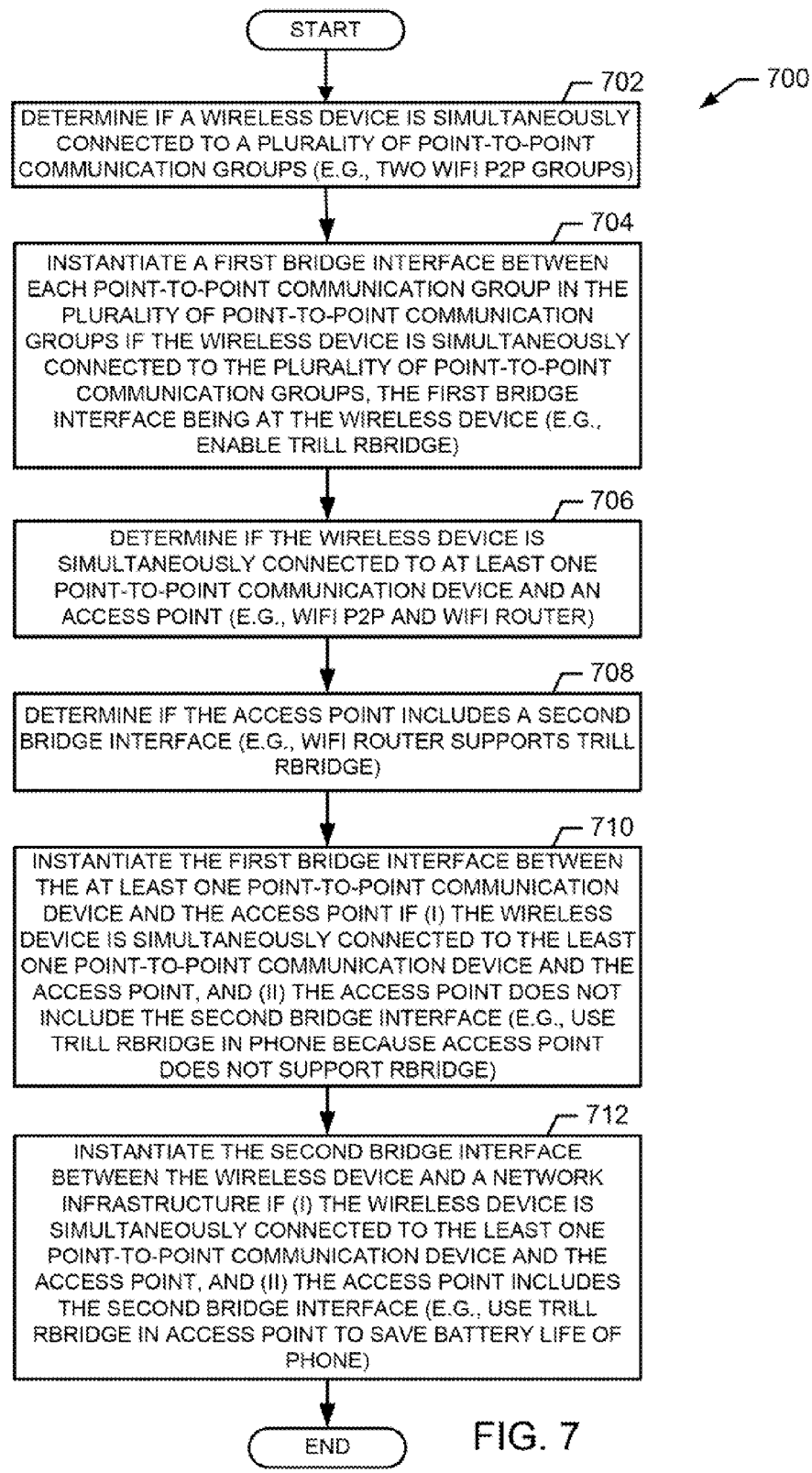
FIG. 7 is a flowchart of yet another example process for transmitting data between different peer-to-peer communication groups.

A flowchart of yet another example process 700 for transmitting data between different peer-to-peer communication groups is illustrated in FIG. 7. The process 700 may be carried out by one or more suitably programmed processors such as a CPU executing software (e.g., block 304 of FIG. 3). The process 700 may also be carried out by hardware or a combination of hardware and hardware executing software. Suitable hardware may include one or more application specific integrated circuits (ASICs), state machines, field programmable gate arrays (FPGAs), digital signal processors (DSPs), and/or other suitable hardware. Although the process 700 is described with reference to the flowchart illustrated in FIG. 7 it will be appreciated that many other methods of performing the acts associated with process 700 may be used. For example, the order of many of the operations may be changed, and some of the operations described may be optional.

In general, a wireless device 102 determines if it is simultaneously connected to a plurality of peer-to-peer communication groups 104 and instantiates a bridge interface at the wireless device 102 (e.g., TRILL RBridge) for communications between each peer-to-peer communication group 104. The wireless device 102 also determines if it is simultaneously connected to at least one peer-to-peer communication device and an access point 202. In such an instance, the wireless device 102 determines if the access point 202 also includes a bridge interface. If the access point 202 does not include a bridge interface, the wireless device 102 instantiates/runs the bridge interface at the wireless device 102 for communications between the at least one peer-to-peer communication device 102 and the access point 202. If the access point 202 does include a bridge interface, the wireless device 102 causes the bridge interface at the access point 202 to be instantiated for communications between the at least one peer-to-peer communication device 102 and the access point 202.

More specifically, the process 700 begins when a wireless device 102 determines if it is simultaneously connected to a plurality of peer-to-peer communication groups 104 (block 702). For example, wireless device 102*e* determines if it is simultaneously connected to peer-to-peer communication group 104*b* and peer-to-peer communication group 104*c*. The wireless device 102 instantiates a first bridge interface between each peer-to-peer communication group 104 in the plurality of peer-to-peer communication groups 104 if the wireless device 102 is simultaneously connected to the plurality of peer-to-peer communication groups 102, the first bridge interface being at the wireless device 102 (block 704). For example, wireless device 102*e* runs a TRILL RBridge.

The wireless device 102 then determines if the wireless device 102 is simultaneously connected to at least one peer-to-peer communication device and an access point 202 (block 706). In one example, wireless device 102*e* is connected to peer-to-peer communication devices 102*c* and 102*f*. However, wireless device 102*e* is not connected to an access point 202. In another example, wireless device 102*f* is connected to peer-to-peer communication devices 102*e* and 102*g*, and wireless device 102*f* is also connected to an access point 202*b*.

As an example of how the order of many of the operations may be changed, the wireless device 102 may determine if the wireless device 102 is simultaneously connected to at least one peer-to-peer communication device and an access point 202 (block 706) before, after, simultaneously, or substantially simultaneously with determining if the wireless device 102 is simultaneously connected to a plurality of peer-to-peer communication groups 104 (block 702). Accordingly, the wireless device 102 may instantiate one bridge interface before, after, simultaneously, or substantially simultaneously with instantiating another bridge interface.

The wireless device 102 then determines if the access point 202 includes a second bridge interface (block 708). For example, wireless device 102*f* determines if access point 202*b* has an RBridge capability. The wireless device 102 instantiates the first bridge interface between the at least one peer-to-peer communication device 102 and the access point 202 if (i) the wireless device 102 is simultaneously connected to the least one peer-to-peer communication device 102 and the access point 202, and (ii) the access point 202 does not include the second bridge interface (block 710). For example, wireless device 102*f* runs a TRILL RBridge locally because access point 202*b* does not support RBridge.

The wireless device 102 instantiates the second bridge interface between the wireless device 102 and a network infrastructure 204 if (i) the wireless device 102 is simultaneously connected to the least one peer-to-peer communication device 102 and the access point 202, and (ii) the access point 202 includes the second bridge interface (block 712). For example, if access point 202*b* included an RBridge like access point 202*c*, wireless device 102*f* would not run the RBridge. Instead, the hypothetical RBridge in access point 202*b* would be used in order to conserve the battery life of wireless device 102*f*.

Figure 8:
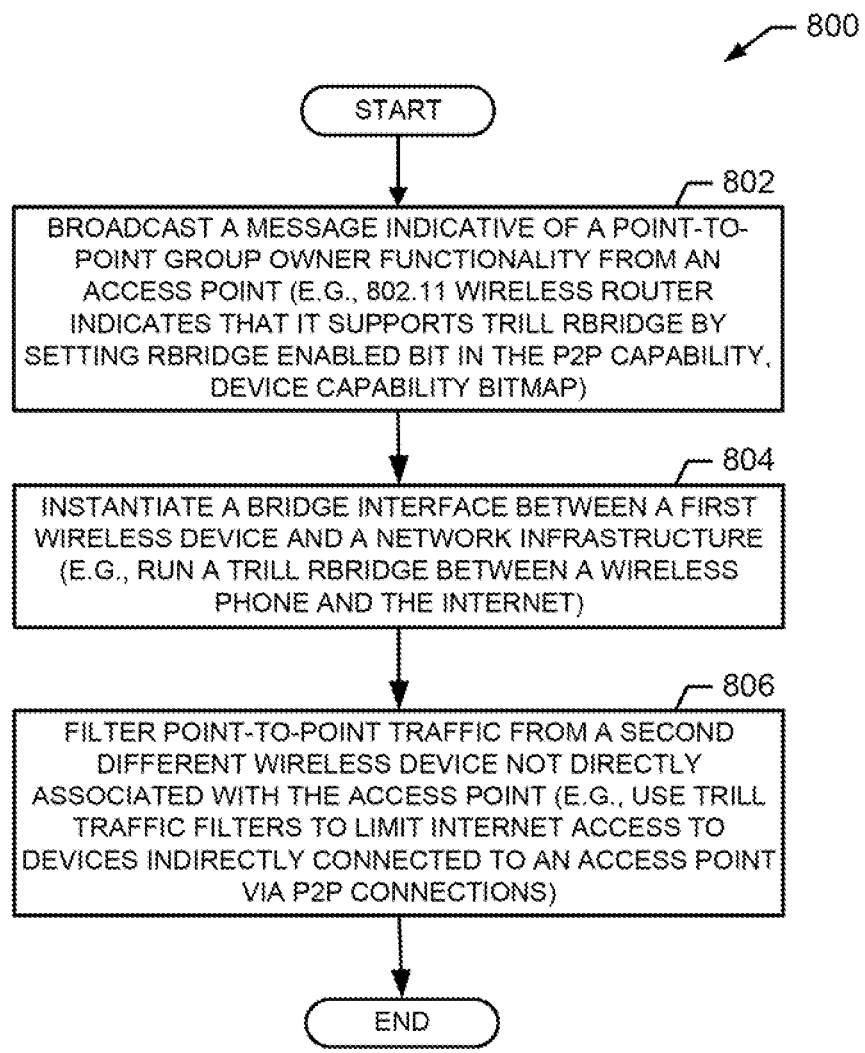
FIG. 8 is a flowchart of still another example process for transmitting data between different peer-to-peer communication groups.

A flowchart of still another example process 800 for transmitting data between different peer-to-peer communication groups is illustrated in FIG. 8. The process 800 may be carried out by one or more suitably programmed processors such as a CPU executing software (e.g., block 304 of FIG. 3). The process 800 may also be carried out by hardware or a combination of hardware and hardware executing software. Suitable hardware may include one or more application specific integrated circuits (ASICs), state machines, field programmable gate arrays (FPGAs), digital signal processors (DSPs), and/or other suitable hardware. Although the process 800 is described with reference to the flowchart illustrated in FIG. 8 it will be appreciated that many other methods of performing the acts associated with process 800 may be used. For example, the order of many of the operations may be changed, and some of the operations described may be optional.

The process 800 begins when an access point 202 broadcasts a message indicative of a peer-to-peer group owner functionality from an access point 202 (block 802). In an example, an 802.11 wireless router broadcasts a message indicating that it supports TRILL RBridge by setting the RBridge enabled bit in the P2P capability, device capability bitmap. The access point 202 then instantiates a bridge interface between a first wireless device 102 and a network infrastructure 204 (block 804). For example, the 802.11 wireless router runs a TRILL RBridge between a wireless phone and the Internet. The access point 202 then filters peer-to-peer traffic from a second different wireless device 102 not directly associated with the access point 202 (block 806). For example, the 802.11 wireless router uses TRILL traffic filters to limit Internet access to wireless devices 102 indirectly connected to an access point 202 via P2P connections.

Figure 9:
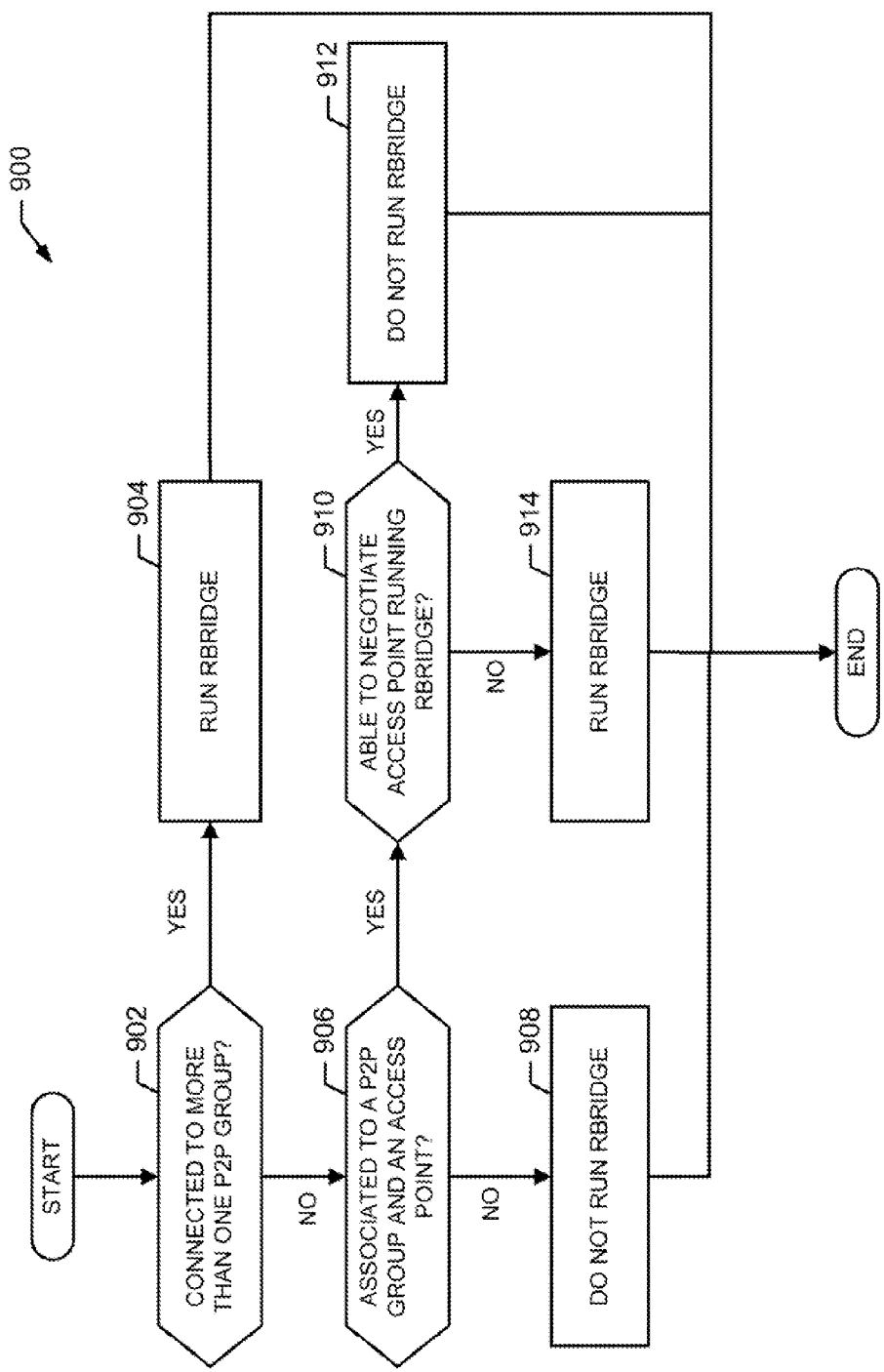
FIG. 9 is a flowchart of an example process for determining if a device will run a bridge to facilitate transmitting data between different peer-to-peer communication groups.

A flowchart of an example process 900 for determining if a device will run a bridge is illustrated in FIG. 9. The process 900 may be carried out by one or more suitably programmed processors such as a CPU executing software (e.g., block 304 of FIG. 3). The process 900 may also be carried out by hardware or a combination of hardware and hardware executing software. Suitable hardware may include one or more application specific integrated circuits (ASICs), state machines, field programmable gate arrays (FPGAs), digital signal processors (DSPs), and/or other suitable hardware. Although the process 500 is described with reference to the flowchart illustrated in FIG. 9, it will be appreciated that many other methods of performing the acts associated with process 900 may be used. For example, the order of many of the operations may be changed, and some of the operations described may be optional.

The process 900 begins when a wireless device 102 determines if the wireless device 102 is connected to two or more P2P groups 104 at the same time (block 902). If the wireless device 102 is connected to two or more P2P groups 104 at the same time, the wireless device 102 runs a bridge interface (block 904). For example, if a wireless device 102, such as a cellular phone, determines that it is associated with two different other wireless devices 102 that are both acting as P2P group owners, the wireless device 102 runs an RBridge.

If the wireless device 102 is not connected to two or more P2P groups 104 at the same time, the wireless device 102 determines if the wireless device 102 is associated with a P2P group 104 and an access point 202 (block 906). If the wireless device 102 is not associated with a P2P group 104 and an access point 202 at the same time, the wireless device 102 does not run a bridge interface (block 908).

If the wireless device 102 is associated with a P2P group 104 and an access point 202 at the same time, the wireless device 102 determines if it is able to negotiate having the access point 202 run the bridge interface (block 910). If the access point 202 is going to run the bridge, the wireless device 102 does not run the bridge (block 912). If the access point 202 is not going to run the bridge, the wireless device 102 runs the bridge instead (block 914).

Figure 10:
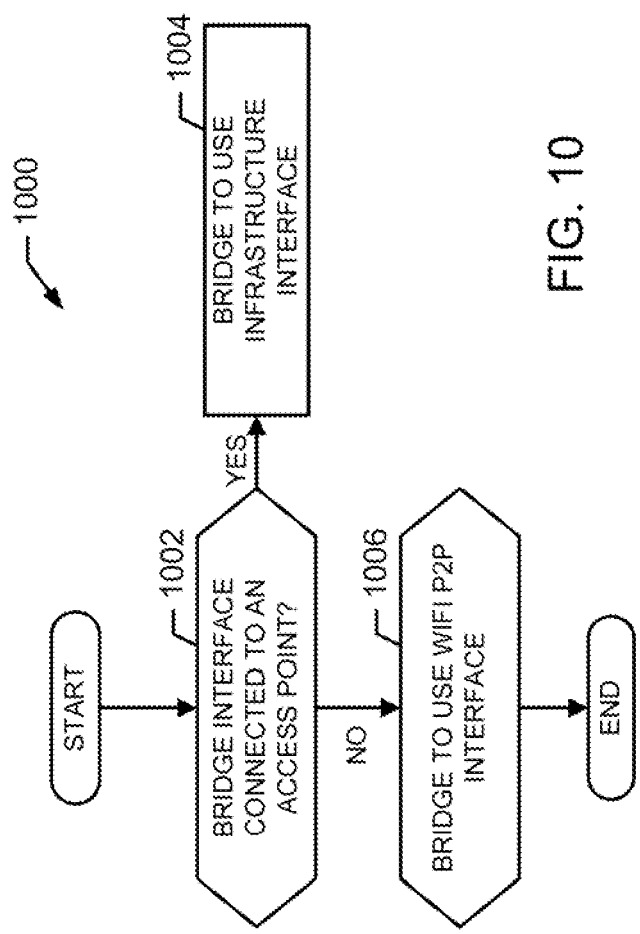
FIG. 10 is a flowchart of an example process for determining what interface a bridge utilizes.

A flowchart of an example process 1000 for determining what interface a bridge utilizes is illustrated in FIG. 10. The process 1000 may be carried out by one or more suitably programmed processors such as a CPU executing software (e.g., block 304 of FIG. 3). The process 1000 may also be carried out by hardware or a combination of hardware and hardware executing software. Suitable hardware may include one or more application specific integrated circuits (ASICs), state machines, field programmable gate arrays (FPGAs), digital signal processors (DSPs), and/or other suitable hardware. Although the process 500 is described with reference to the flowchart illustrated in FIG. 10, it will be appreciated that many other methods of performing the acts associated with process 1000 may be used. For example, the order of many of the operations may be changed, and some of the operations described may be optional.

The process 1000 begins when a bridge interface (e.g., an RBrdige) determines if it is connected to an access point 202 (block 1002). If the bridge interface is connected to an access point 202, the bridge uses an infrastructure interface (block 1004). However, if the bridge interface is not connected to an access point 202, the bridge uses a Wi-Fi P2P interface (block 1006).

In summary, persons of ordinary skill in the art will readily appreciate that methods and apparatus for transmitting data between different peer-to-peer communication groups have been provided. Among other features, wireless devices using the disclosed methods and apparatus are able to discover each other and dynamically form very large peer-to-peer groups in manner that consumes very little power and scales efficiently.

The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto.

What is claimed is:

1. A method of transmitting data between different peer-to-peer communication groups, the method comprising:
   broadcasting a message indicative of a peer-to-peer group owner functionality from an access point, the message including an indication that the access point supports a bridge interface, the message indicating the bridge interface is a Transparent Interconnection of Lots of Links (TRILL) RBridge interface, and the indication comprising setting an RBridge-enabled bit in a capability bitmap;
   instantiating the bridge interface at the access point to transmit data between a first wireless device and a network infrastructure, the first wireless device being a member of a peer-to-peer communication group;
   filtering peer-to-peer traffic, based on a class of traffic, from a second different wireless device not directly associated with the access point; and
   routing the peer-to-peer traffic based on the filtering.

2. The method of claim 1, wherein the filtering the peer-to-peer traffic from the second wireless device includes filtering the peer-to-peer traffic to limit Internet access to the second different wireless device.

3. The method of claim 1, wherein the filtering the peer-to-peer traffic from the second wireless device includes using Transparent Interconnection of Lots of Links (TRILL) control traffic filters to control access to the network infrastructure by the second wireless device.

4. The method of claim 1, wherein the first wireless devices causes the instantiating the bridge interface at the access point.

5. The method of claim 1, wherein the routing the peer-to-peer traffic based on the filtering includes forwarding the peer-to-peer traffic to another wireless device in another peer-to-peer group and wherein another access point is the owner of the another peer-to-peer group.

6. The method of claim 5, wherein the access point and the another access point are connected to the network infrastructure and wherein the network infrastructure is one or more of: a Local Area Network (LAN), a Wide Area Network (WAN), or the Internet.

7. An electronic apparatus configured as an access point for transmitting data between peer-to-peer communication groups, the electronic apparatus comprising:
   a radio frequency transceiver;
   a controller, operatively coupled to the radio frequency transceiver; and
   a memory device comprising instructions executable by the controller to configure the access point to:
      broadcast a message indicative of a peer-to-peer group owner functionality, the message including an indication that the access point supports a bridge interface, the message indicating the bridge interface is a Transparent Interconnection of Lots of Links (TRILL) RBridge interface, and the indication comprising setting an RBridge-enabled bit in a capability bitmap;
      instantiate the bridge interface, at the access point, to transmit data between a first wireless device and a network infrastructure, the first wireless device being a member of a peer-to-peer communication group;
      filter peer-to-peer traffic, based on a class of traffic, from a second different wireless device not directly associated with the access point; and
      route the peer-to-peer traffic based on the filtering.

8. The electronic apparatus of claim 7, wherein the filtering the peer-to-peer traffic from the second different wireless device includes filtering the peer-to-peer traffic to limit Internet access to the second different wireless device.

9. The electronic apparatus of claim 7, wherein the filtering of the peer-to-peer traffic from the second wireless device includes using Transparent Interconnection of Lots of Links (TRILL) control traffic filters to control access to the network infrastructure by the second different wireless device.

10. The electronic apparatus of claim 7, wherein a plurality of devices in the peer-to-peer communication group and a second plurality of devices in another peer-to-peer communication group are each members of the same Internet Protocol (IP) subnet.

11. The electronic apparatus of claim 7, wherein the access point is configured as a Wi-Fi peer-to-peer communication group owner for the peer-to-peer communication group.

12. The electronic apparatus of claim 7, wherein the first wireless device causes the access point to instantiate the bridge interface.

13. The electronic apparatus of claim 7, further comprising:
   a network interface to connect the access point to the network infrastructure; and
   wherein the routing the peer-to-peer traffic based on the filtering includes forwarding the peer-to-peer traffic to another wireless device in another peer-to-peer group via the network interface.

14. The method of claim 13, wherein the network infrastructure is one or more of: a Local Area Network (LAN), a Wide Area Network (WAN), or the Internet.

15. A system for transmitting data between peer-to-peer communication groups, the system comprising:
   a first wireless device;
   a second wireless device; and
   an access point, the access point configured to:
      broadcast a message indicative of a peer-to-peer group owner functionality, the message including an indication that the access point supports a bridge interface, the message indicating the bridge interface is a Transparent Interconnection of Lots of Links (TRILL) RBridge interface, and the indication comprising setting an RBridge-enabled bit in a capability bitmap;
      instantiate the bridge interface, at the access point, to transmit data between the first wireless device and network infrastructure, the first wireless device being a member of a peer-to-peer communication group;

filter peer-to-peer traffic, based on a class of traffic, from a second different wireless device not directly associated with the access point; and route the peer-to-peer traffic based on the filtering.

16. The system of claim 15, the first wireless device configured to causes the access point to instantiate the bridge interface.

17. The system of claim 15, wherein the filtering of the peer-to-peer traffic from the second different wireless device includes filtering peer-to-peer traffic to limit Internet access to the second different wireless device.

18. The system of claim 15, wherein the filtering of the peer-to-peer traffic from the second wireless device includes using Transparent Interconnection of Lots of Links (TRILL) control traffic filters to control access to the network infrastructure by the second different wireless device.

19. The system of claim 15, wherein a plurality of devices in the peer-to-peer communication group and a second different plurality of devices in another peer-to-peer communication group are each members of the same Internet Protocol (IP) subnet.

20. The system of claim 15, wherein the access point is configured as a Wi-Fi peer-to-peer communication group owner for the peer-to-peer communication group.

\* \* \* \* \*